US012085244B1

(12) United States Patent
Tsai

(10) Patent No.: US 12,085,244 B1
(45) Date of Patent: Sep. 10, 2024

(54) LIGHT EMITTING DIODE LIGHT STRING

(71) Applicant: Chang Fu Tsai, Taichung (TW)

(72) Inventor: Chang Fu Tsai, Taichung (TW)

( * ) Notice: Subject to any disclaimer, the term of this patent is extended or adjusted under 35 U.S.C. 154(b) by 0 days.

(21) Appl. No.: 18/454,929

(22) Filed: Aug. 24, 2023

(51) Int. Cl.
*F21S 4/10* (2016.01)
*F21V 23/06* (2006.01)

(52) U.S. Cl.
CPC ................ *F21S 4/10* (2016.01); *F21V 23/06* (2013.01)

(58) Field of Classification Search
CPC ....... F21S 4/10; F21S 4/00; F21S 4/15; F21V 23/06; F21V 23/00; F21V 31/00; F21V 31/04; F21V 19/0015; F21V 19/001; F21Y 2115/10; F21W 2131/10; F21W 2121/04
See application file for complete search history.

(56) References Cited

U.S. PATENT DOCUMENTS 7,740,503 B1 * 6/2010 Tsai .................... H01R 13/6608 439/619
10,393,351 B2 * 8/2019 Chen ..................... F21V 17/101
11,499,700 B1 * 11/2022 Tsai ........................... F21S 4/10
2009/0190359 A1 * 7/2009 Li ........................... F21K 9/232 362/311.01

* cited by examiner

*Primary Examiner* — Bao Q Truong
(74) *Attorney, Agent, or Firm* — Thomas E. Lees, LLC

(57) ABSTRACT

A light string includes a housing, a light cap, and a light assembly. The light cap has a cap body, an upper tip at an upper end of the cap body, and a peripheral visibility ring extending outwardly from the cap body opposite the upper tip. The light cap is coupled to and extends from the housing such that the peripheral visibility ring seats adjacent to an end of the housing proximate the light aperture. The light assembly includes a light emitting source that is positioned such that when energized, light is emitted that is visible from outside the light cap. Moreover, the peripheral visibility ring reflects light in a direction different from the light emitted by the light emitting source such that the light emitted by the light emitting source is visible when an observer is looking at a side view of the cap body.

21 Claims, 23 Drawing Sheets

LIGHT EMITTING DIODE LIGHT STRING

BACKGROUND

Field of the Invention

Various aspects herein relate generally to a light string, and in particular to a light string and method of making a light string that incorporates an illumination device such as a light emitting diode (LED) in a configuration that is has improved visibility when viewed from multiple orientations.

Description of Related Art

Illumination can be particularly impactful when used with decorations. One popular form of illumination commonly used with decorations is a "light string", also referred to as "string lights". A light string is basically a set of light elements, where each light element is spaced a small distance apart from adjacent light elements, typically on a flexible cable that permits wrapping or otherwise conforming the light string to a decoration or other structure. The light elements typically share a common electrical circuit and derive power from a single wall plug, simplifying deployment of the light string.

BRIEF SUMMARY

According to aspects of the present disclosure, a light string comprises a housing, a light cap, and a light assembly. The housing comprises a passageway therethrough defining a light aperture and a wire aperture. The light cap comprises a cap body that is non-opaque. Further, the cap body has a hollow therein. The light cap also includes an upper tip at an upper end of the cap body forming an enclosed tip (or bulb portion) of the light cap. Additionally, the light cap includes a peripheral visibility ring extending outwardly from the cap body opposite the upper tip. The peripheral visibility ring is also non-opaque. The light cap is coupled to and extends from the housing such that the hollow of the cap body aligns axially with the light aperture and the peripheral visibility ring seats adjacent to an end of the housing proximate the light aperture.

Yet further, the light assembly comprises a light emitting source having a first contact, a second contact, and a light emitter coupled to the first contact and the second contact. A first conductive lead wire is electrically coupled to the first contact of the light emitting source. Likewise, a second conductive lead wire is electrically coupled to the second contact of the light emitting source. The light assembly is coupled to the housing such that the first conductive lead wire and the second conductive lead wire extend out from the wire aperture of the housing. Moreover, a filler is deposited in the light cap. The filler is transparent when solidified. When assembled, the filler couples the light cap and light assembly to the housing.

The light emitting source, when energized, emits light visible from outside the light cap. The filler defines a light guide that directs light within the light cap to the peripheral visibility ring. Also, the peripheral visibility ring reflects light in a direction different from the light emitted by the light emitting source such that the light emitted by the light emitting source is visible when an observer is looking at a side view of the cap body.

According to further aspects herein, a light string is provided. The light string comprises an electrical plug that plugs into a source of electrical power, a wire set coupled to the electrical plug, and a set of light string assemblies coupled to the wire set. Each light string assembly comprises a housing assembly and a light assembly. The housing assembly comprises a housing and a light cap. The housing includes a passageway therethrough defining a light aperture and a wire aperture. The light cap comprises a cap body that is non-opaque, where the cap body includes a hollow therein. The light cap also includes an upper tip at an upper end of the cap body forming an enclosed end of the light cap. Yet further, the light cap includes a peripheral visibility ring extending outwardly from the cap body opposite the upper tip. In this regard, the peripheral visibility ring is also non-opaque. The light cap is coupled to and extends from the housing such that the hollow of the cap body aligns axially with the light aperture and the peripheral visibility ring seats adjacent to an end of the housing proximate the light aperture.

The light assembly has a light emitting source having a first contact, a second contact, and a light emitter coupled to the first contact and the second contact. Additionally, a first conductive lead wire is electrically coupled to the first contact of the light emitting source, and a second conductive lead wire is electrically coupled to the second contact of the light emitting source. A spacer plug having an insulative projection extends between the first conductive lead wire and the second conductive lead wire.

Yet further, a filler is deposited in the light cap. The filler is transparent when solidified. Moreover, the filler couples the light cap and light assembly to the housing.

Accordingly, the light assembly is coupled to the housing such that the light emitting source extends into and bonds with the filler, and at least a portion of the insulative projection extends into and bond with the filler. Also, the first conductive lead wire extends out the wire aperture of the housing, and the second conductive lead wire extends out the wire aperture of the housing. Also, the light emitting source, when energized, emits light visible from outside the light cap. The filler defines a light guide that directs light within the light cap to the peripheral visibility ring, and the peripheral visibility ring reflects light in a direction different from the light emitted by the light emitting source such that the light emitted by the light emitting source is visible when an observer is looking at a side view of the cap body.

According to still further aspects of the present disclosure, a method of making an light string is provided. The method comprises forming a housing assembly and forming a light assembly. The housing assembly is formed by coupling a light cap to a housing. Here, the light cap has a cap body that is non-opaque. Moreover, the cap body has a hollow therein. An upper tip at an upper end of the cap body forms an enclosed end of the light cap. Also, a peripheral visibility ring extends outwardly from the cap body opposite the upper tip. The peripheral visibility ring is also non-opaque. The light cap is coupled to and extends from the housing such that the hollow of the cap body aligns axially with the light aperture of the housing. Further, the light cap is coupled to and extends from the housing such that the hollow of the cap body aligns axially with the light aperture of the housing. In this configuration, the peripheral visibility ring seats adjacent to an end of the housing proximate the light aperture.

The light assembly is formed by coupling a first conductive lead wire to a first contact of a light emitting source so as to form a first electrical connection, and by coupling a second conductive lead wire to a second contact of the light emitting source so as to form a second electrical connection. The light emitting source further comprises a light emitter electrically connected to the first contact and the second contact. Here, the light assembly is further formed by inserting a spacer plug between the first conductive lead wire and the second conductive lead wire so that an insulative projection of the spacer plug separates the first conductive lead wire from the second conductive lead wire. The method still further comprises inserting filler into the light cap. The filler is transparent when solidified. Also, the filler couples the light cap and light assembly to the housing.

Still further, the method comprises inserting the light assembly into the housing assembly through a wire aperture of the housing, such that the light emitter of the light emitting source extends into the filler in the light cap. Also, at least a portion of the insulative projection of the spacer plug extends into the filler in the light cap. Here, the filler bonds the spacer plug and the light emitting source to the light cap. The filler further defines a light guide that directs light within the light cap to the peripheral visibility ring. The peripheral visibility ring reflects light in a direction different from the light emitted by the light emitting source such that the light emitted by the light emitting source is visible when an observer is looking at a side view of the cap body.

DETAILED DESCRIPTION

Figure 1A:
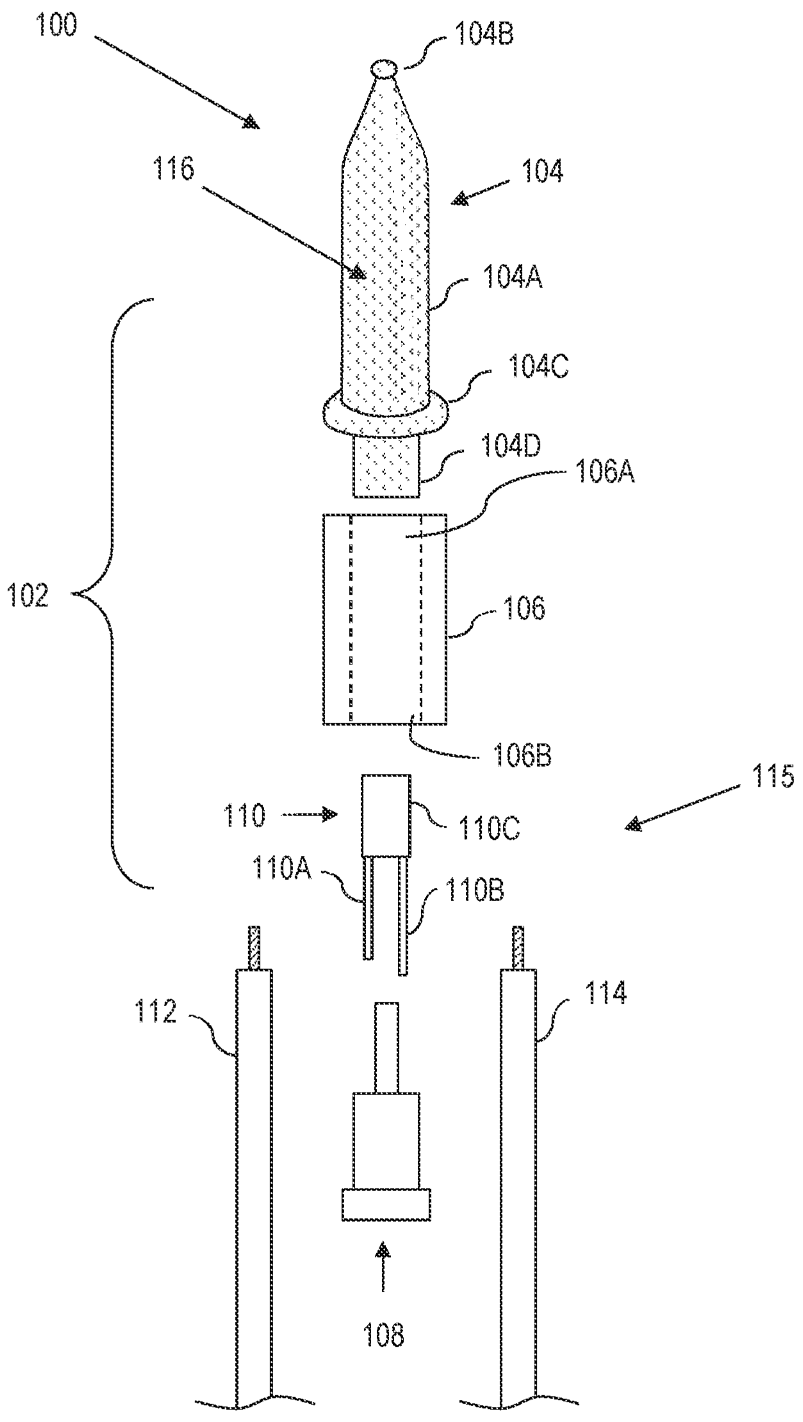
FIG. 1A is an exploded view of the components of a section of a light string showing a first example cap configuration according to aspects herein.

Aspects herein provide a light string having an improved light emitting diode (LED) light assembly that provides greatly improved peripheral visibility of light compared to conventional LED based light elements. Moreover, aspects herein provide a light string that is particularly well suited for indoor as well as outdoor usage. In this regard, conductors that connect electrical power to each light emitting element are sealed (and in some instances, encapsulated) and are thus waterproof or at least water resistant. Because each electrical connection is sealed, the light string is particularly well suited for use outdoors.

More particularly, a filler is deposited in a light cap. The filler is transparent when solidified, and couples the light cap and a light assembly to a housing. Surprisingly however, the filler further defines a light guide that directs light within the light cap to a peripheral visibility ring, thus greatly increasing the visibility of light from the sides of the light cap.

Referring now to the drawings, and in particular to FIG. 1A, FIG. 1B, FIG. 1C, FIG. 1D, FIG. 1E, and FIG. 1F generally, an exploded view illustrates select components of an example section of a light string 100, and in particular, an exploded view of a light element. Like structure is illustrated with like reference numbers for convenience of discussion in the above-mentioned FIGURES.

The light element of the light string 100 includes a housing assembly 102, which is made up of a light cap 104, and a housing 106.

FIG. 1A, FIG. 1B, FIG. 1C, FIG. 1D, FIG. 1E, and FIG. 1F respectively, illustrate six different example variations of the light cap 104 and/or housing 106.

Regardless of the embodiment, the light cap 104 has a hollow therein. Moreover, the light cap 104 includes generally, a cap body 104A that is non-opaque. As used herein, "non-opaque" means capable of allowing at least some amount of light emitted within the hollow of the light cap 104 to be visible from outside of the light cap 104 or at least visible on the outer surface of the light cap 104. Example light caps 104 may be transparent, translucent, frosted, etc.

Figure 1B:
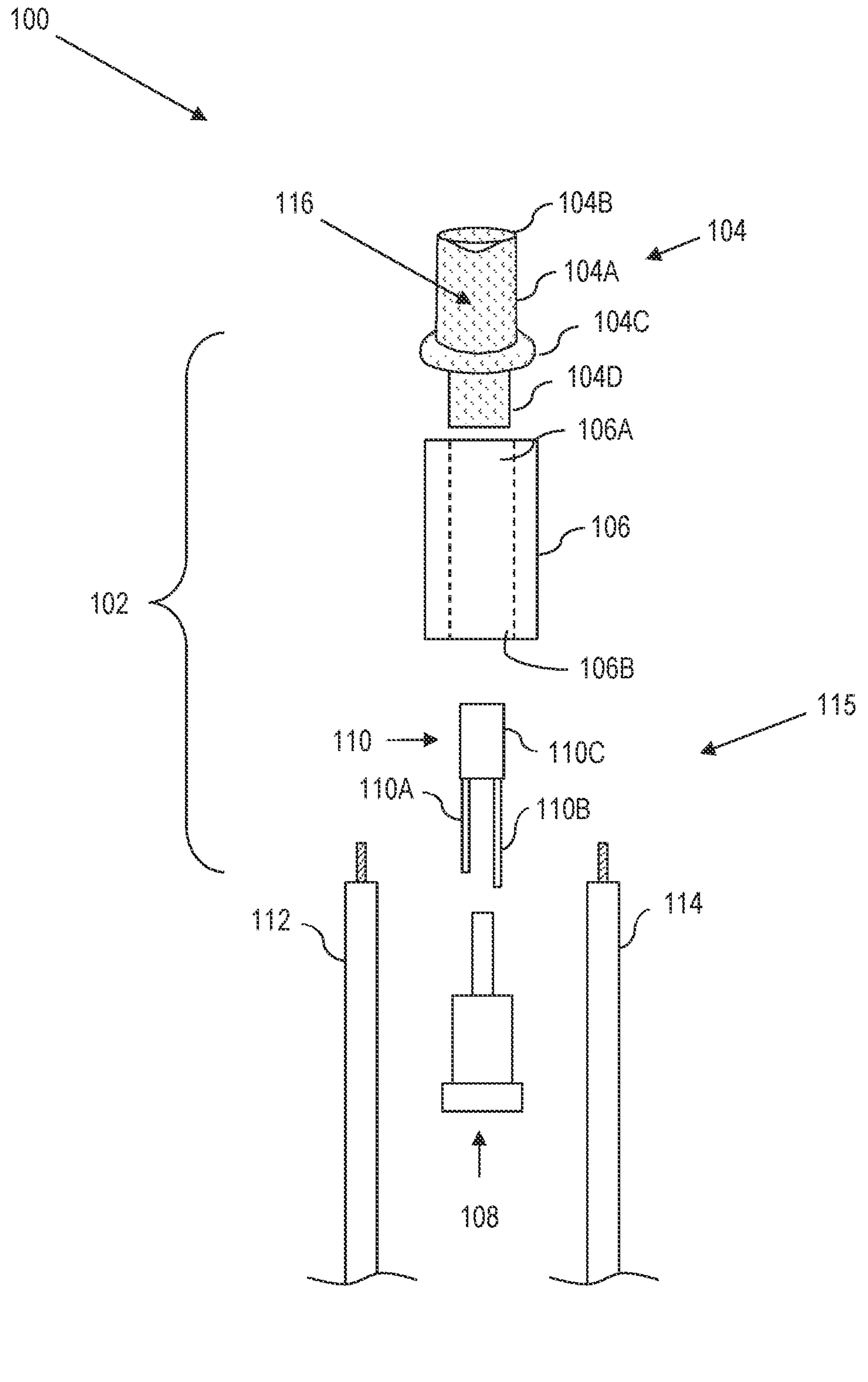
FIG. 1B is an exploded view of the components of a section of a light string showing a second example cap configuration according to aspects herein.
Figure 1C:
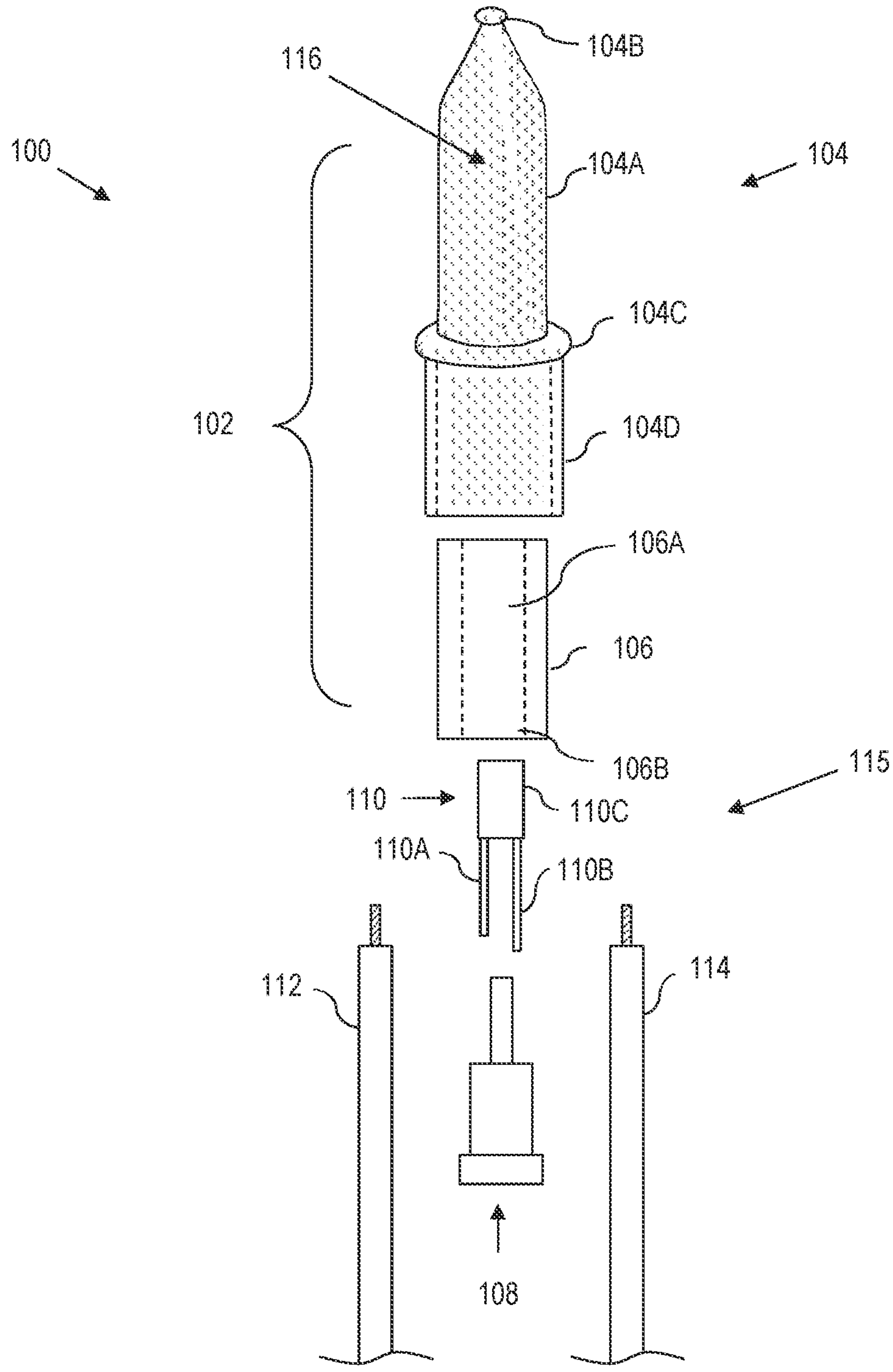
FIG. 1C is an exploded view of the components of a section of a light string showing a third example cap configuration according to aspects herein.
Figure 1D:
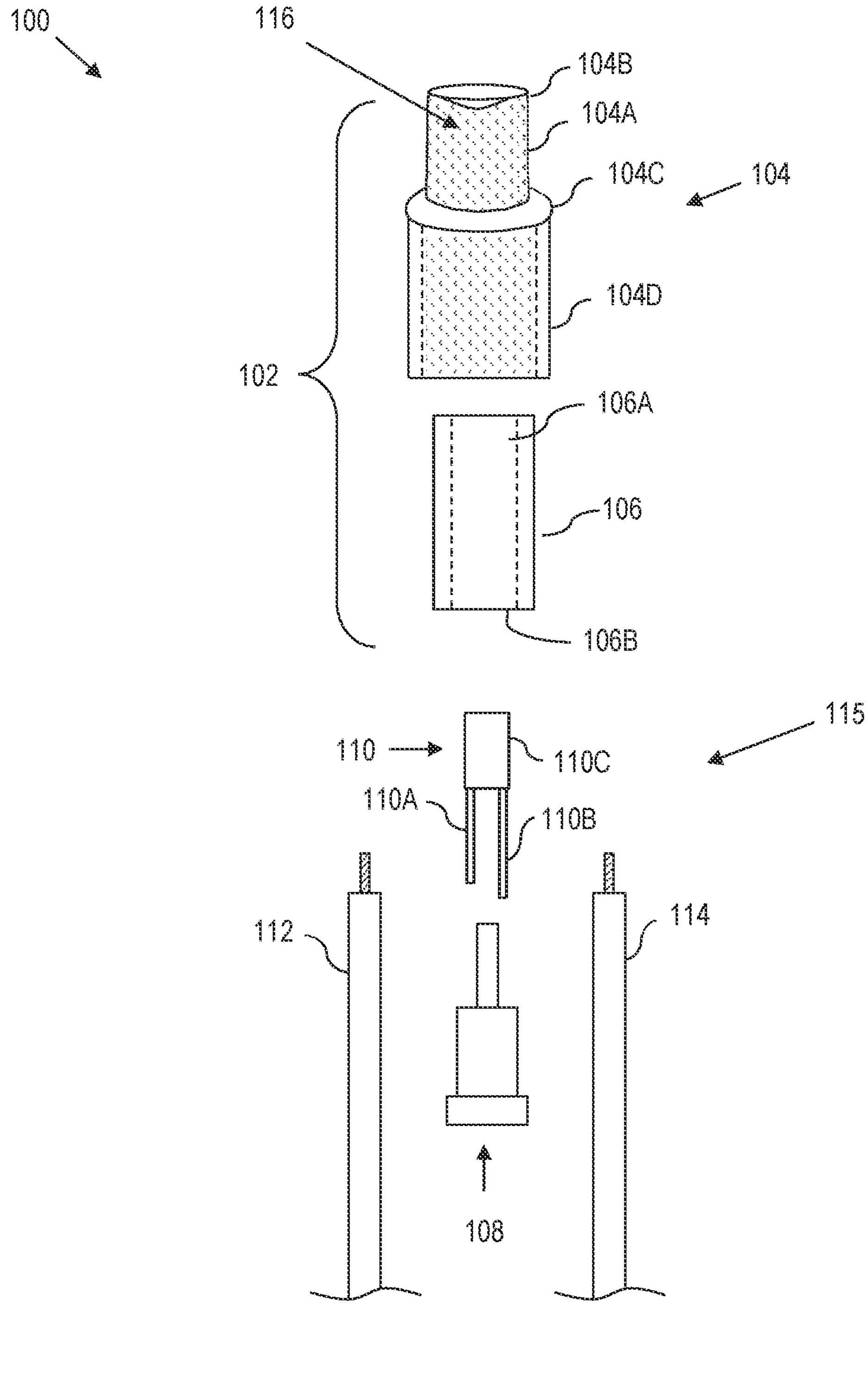
FIG. 1D is an exploded view of the components of a section of a light string showing a fourth example cap configuration according to aspects herein.
Figure 1E:
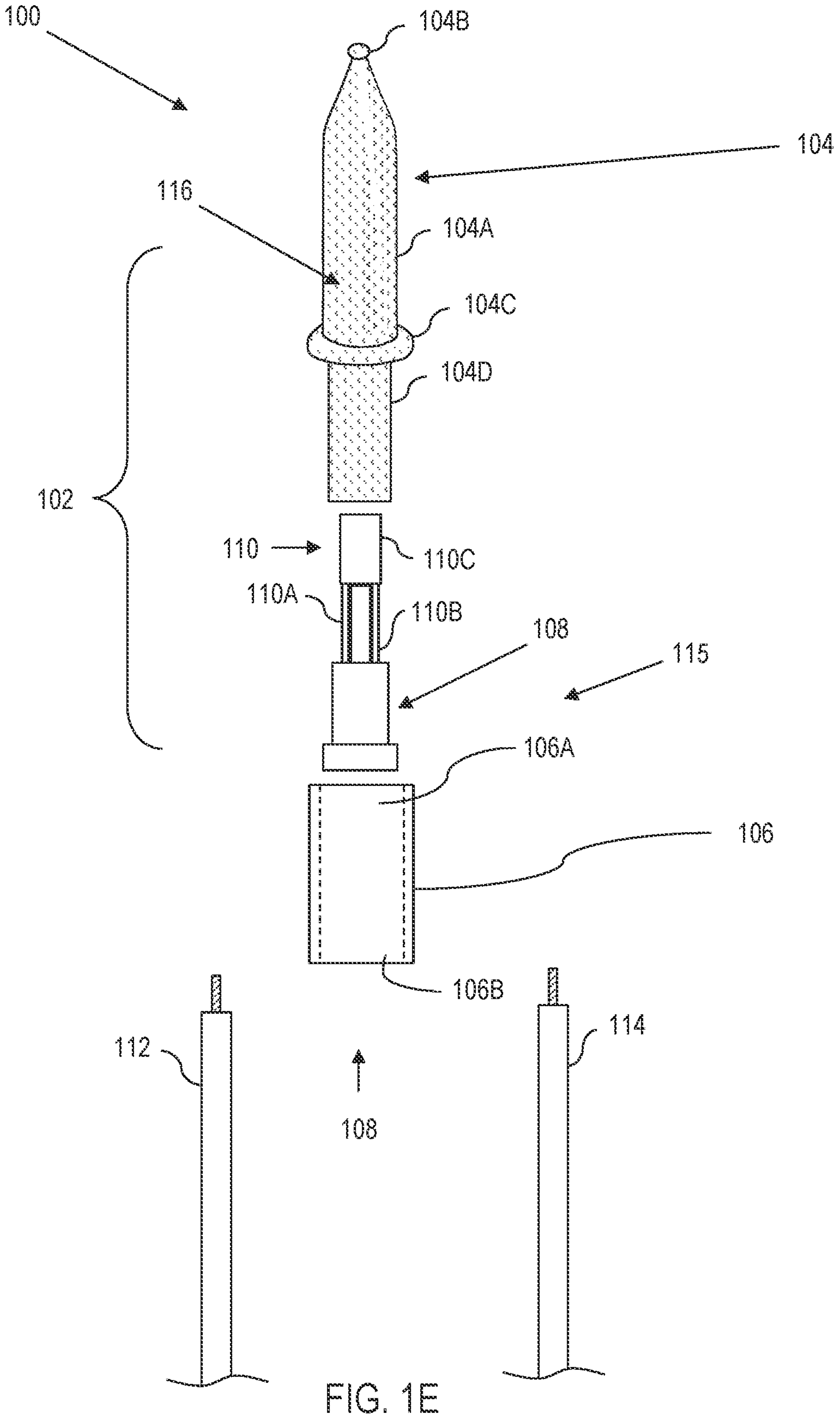
FIG. 1E is an exploded view of the components of a section of a light string showing a fifth example cap configuration according to aspects herein.
Figure 1F:
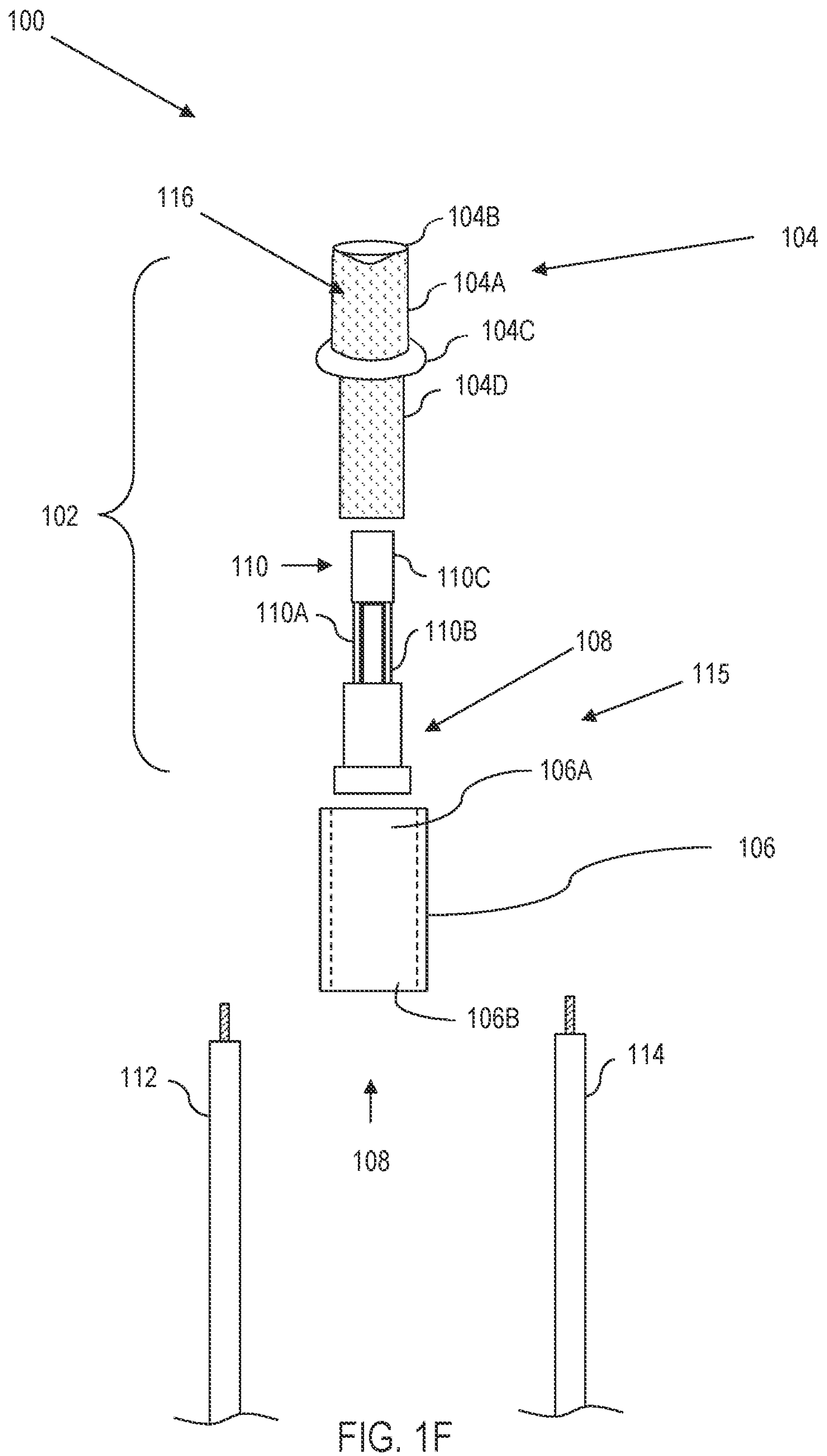
FIG. 1F is an exploded view of the components of a section of a light string showing a sixth example cap configuration according to aspects herein.

The light cap 104 also includes an upper tip 104B at an upper end of the cap body 104A forming an enclosed end of the light cap 104. FIG. 1A, FIG. 1C, and FIG. 1E show the tip 104B as tapering upward and inward forming a generally frustro-conical shape, terminating with a ball at the distal end of the upper tip 104B. The ball and taper shape allow light emitted within the hollow to reflect outward and/or back into the light cap 104, thus increasing the visibility of the light string. By comparison, FIG. 1B, FIG. 1D, and FIG. 1F show the tip 104B as generally flattened off. In some embodiments, a conical, pyramid, or other shape of material is provided within the upper tip 104B, e.g., to allow light emitted within the hollow to reflect outward and/or back into the light cap 104, thus increasing the visibility of the light string. Other shapes can be utilized to form the tip 104B, such as for decorative, functional or other purposes.

Referring back to FIG. 1A, FIG. 1B, FIG. 1C, FIG. 1D, FIG. 1E, and FIG. 1F generally, the light cap 104 further includes a peripheral visibility ring 104C. The peripheral visibility ring 104C is illustrated extending outwardly from the cap body 104A opposite the upper tip 104B. The peripheral visibility ring 104C can have a generally flanged shape, an arcuate shape, a donut shape, etc. The peripheral visibility ring 104C is also non-opaque.

The peripheral visibility ring 104C need not entirely circumscribe the cap body 104A, and may be provided in one or more sections. As will be described in greater detail herein, the peripheral visibility ring 104C reflects light in directions that are angularly different from the principle direction of light emitted within the hollow of the light cap 104 (e.g., different from an axial direction). For instance, the peripheral visibility ring 104 can direct light out the sides of the cap body 104A (e.g., radially or at some angle that is not parallel to an axial dimension) and/or out the peripheral visibility ring 104C itself, so as to make the light significantly brighter and more visible from a view that is orthogonal or at some other angle that is not axial to the light element, compared to conventional LED light strings. As such, the peripheral visibility ring 104C makes LED based light elements (including colored light elements) appear more vibrant and/or dense in color from a greater range of angles, compared to conventional LED based light elements.

In general, the housing 106 is a tube-like structure, having a passageway therethrough. The passageway defines a light aperture 106A (an opening into the passageway for receiving a light element) and a wire aperture 106B (an opening into the passageway for providing an exit for corresponding wiring, e.g., an aperture for one or more wires). In some embodiments, the wire aperture 106B is opposite the light aperture 106A (e.g., on opposite ends of the passageway through the tube-like structure).

Figure 1G:
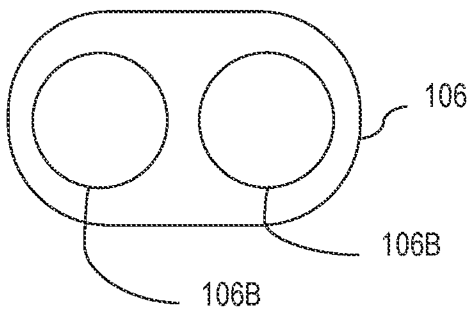
FIG. 1G illustrates a bottom view of a housing having apertures through a bottom portion thereof, for passing wires into a light string assembly, according to aspects herein.

Referring briefly to FIG. 1G, in some embodiments, the housing 106 need not have a circular cross section. Depending upon the configuration of the housing 106 and corresponding parts, the housing 106 can have an oval cross section, or other shape. FIG. 1G also shows that in some embodiments, the distal end of the housing can be generally closed/sealed off, allowing two or more wire apertures 106B. In general, there can be a wire aperture 106B for each wire that exits the housing 106. Moreover, the wire apertures 106B in this embodiment, can be just large enough to allow the insulation of a corresponding wire (not shown) to pass through. In this embodiment, the housing 106 still includes a larger passageway through a central portion thereof, and thus only an end view is illustrated for sake of conciseness.

Referring back to FIG. 1A, FIG. 1B, FIG. 1C, FIG. 1D, FIG. 1E, and FIG. 1F generally, the light cap 104 is coupled to and extends from the housing 106 such that the hollow of the cap body 104A aligns axially with the light aperture 106A and the peripheral visibility ring 104C seats adjacent to an end of the housing 106 proximate the light aperture 106A. Thus, as illustrated, the light cap 104 is coupled to and extends from the housing 106 such that the hollow of the light cap 104 aligns axially with the light aperture 106A.

In some embodiments, the peripheral visibility ring 104C comprises a reflector that reflects light such that a brightness of light viewed from the cap body 104A (e.g., from a side view, or non-axial view) is potentially similar to a brightness of light observed when viewing the upper tip 104B (an axial view). Also, in some embodiments, the upper tip 104B of the light cap 104 comprises a tip reflector that reflects some light towards the peripheral visibility ring 104C.

The light cap 104 can also include a securement 104D. As will be described in greater detail herein the securement 104D provides a portion of the light cap 104 that couples to the housing 106.

Referring briefly to FIG. 1A and FIG. 1B, in some embodiments, the light cap 104 is inserted into the housing 106, such as by inserting the securement 104D into the housing 106 via the light aperture 106A. That is, the securement 104D plugs into the housing 106 via the light aperture 106A of the housing 106. Optional features such as a ring and corresponding groove around the inside if the light aperture/outside of the securement 104D can be provided to snap or mechanically lock the light cap 104 to the housing 106.

Referring briefly to FIG. 1C and FIG. 1D, in some embodiments, the light cap 104 is inserted over the outside of the housing 106, e.g., by slipping the securement 104D over the housing 106. In this regard, the light cap 104 can extend partially or entirely down the housing 106. For instance, the light cap 104 extends down to a distal end of the housing 106 or beyond.

Referring briefly to FIG. 1E and FIG. 1F, in some embodiments, the light cap 104 is inserted into the housing 106, such as by inserting the securement 104D into the housing 106 via the light aperture 106A such that the securement 104D further slips over a spacer plug 108. That is, the securement 104D plugs in between the housing 106 via the light aperture 106A of the housing 106, and the spacer plug 108.

Referring back to FIG. 1A, FIG. 1B, FIG. 1C, FIG. 1D, FIG. 1E and FIG. 1F generally, in some embodiments, the housing assembly 102 can also include a spacer plug 108. In other embodiments, the spacer plug 108 can form part of a light assembly as described in greater detail herein. The light cap 104, housing 106, and spacer plug 108 will each be described in greater detail herein.

The spacer plug 108 is inserted into the housing 106, e.g., through the wire aperture 106B, and is used to secure, insulate, seal, etc., electrical wiring, as will be described in greater detail herein. Thus, when assembled, the spacer plug 108 is positioned at least partially within the housing 106.

The light string 100 also includes a light assembly, having a light emitting source 110, a first conductive lead wire 112 electrically coupled to the light emitting source 110 that extends out from the wire aperture 106B of the housing 106, and a second conductive lead wire 114 electrically coupled to the light emitting source 110 that extends out from the wire aperture 106B of the housing 106.

For instance, in some embodiments, the light emitting source 110 is positioned, at least partially, within the housing assembly 102. Also, in some embodiments, the light assembly also has a first contact 110A, a second contact 110B, and a light emitter 110C coupled to the first contact 110A and the second contact 110B. In some embodiments, the first contact 110A and the second contact 110B are conductive legs that extend from the light emitter 110C, which supply power to a light emitting diode (LED) of the light emitter 110C. For instance, the first conductive leg can function as an anode connector of the LED, and is thus also referred to herein as an anode leg. Analogously, the second conductive leg can function as a cathode connector of the LED and is thus also referred to herein as a cathode leg. In other embodiments, such as where a chip LED is implemented, the first contact 110A and the second contact 110B can be implemented as conductive pads, e.g., forming the anode connector and cathode connector of the LED.

As noted above, in some embodiments, the light string 100 also comprises a first conductive lead wire 112, and a second conductive lead wire 114. The first conductive lead wire 112 extends into/out of the housing 106 through the wire aperture 106B. In some embodiments, the first conductive lead wire 112 is secured within the housing 106 adjacent to a first side of the spacer plug 108, and is electrically coupled to the first contact 110A of the light emitting source 110 (e.g., the first conductive lead wire 112 is wire bonded to the anode leg). Wire bonding can be carried out by techniques such as splicing, contact crimping, welding, soldering, combinations thereof, etc.

Analogously, the second conductive lead wire 114 extends into/out of the housing 106 through the wire aperture 106B. In some embodiments, the second conductive lead wire 114 is secured within the housing 106 adjacent to a second side of the spacer plug 108 and is electrically coupled to the second contact 110B of the light emitting source 110 (e.g., the second conductive lead wire 114 is wire bonded to the cathode leg). Analogous to that above, wire bonding can be carried out by techniques such as splicing, contact crimping, welding, soldering, combinations thereof, etc.

In alternative embodiments, there can be one or more additional lead wire(s), each electrically coupled to the first contact 110A or the second contact 110B, such as for wiring schemes that require parallel circuits, split feeds, etc.

In some embodiments, the spacer plug 108 includes an insulative projection or arm that is seated between the first conductive lead wire 112 and the second conductive lead wire 114 within the housing 106 (and optionally, between the first contact 110A and the second contact 110B, e.g., when implemented as an anode leg and cathode leg). For instance, the insulative projection can assist to prevent an electrical short between the first conductive lead wire 112 and the second conducive lead wire 114.

In some embodiments, the light string 100 includes a light assembly 115. Here, the light assembly 115 is made up of the light emitting source 110 (e.g., the light emitting source having the first contact 110A, the second contact 110B, and the light emitter 110C coupled to the first contact 110A and the second contact 110B). The light assembly 115 also include the first conductive lead wire 112, which is electrically coupled (e.g., spliced, contact crimped, welded, soldered, etc.,) to the first contact 110A of the light emitting source 110, and analogously includes the second conductive lead wire 114, which is electrically coupled (e.g., spliced, contact crimped, welded, soldered, etc.) to the second contact 110B of the light emitting source 110.

In this example embodiment, the spacer plug 108 forms part of the light assembly 115, and includes an insulative projection that extends between the first conductive lead wire 112 and the second conductive lead wire 114. However, as noted above, in alternative configurations, the spacer plug 108 can be treated as a separate component altogether, or the spacer plug 108 can be treated as part of the housing assembly 102.

In some embodiments, a filler 116 is deposited in the light cap 104. The filler 116 is transparent when solidified. Here, the filler 116 is for coupling the light cap 104 and light assembly 115 to the housing 106.

In some embodiments, the light emitting source 110, when energized, emits light that is visible from outside the light cap 104. Here, the filler 116 defines a light guide that directs light within the light cap to the peripheral visibility ring 104C, and the peripheral visibility ring 104C reflects light in a direction different from the light emitted by the light emitting source 110 such that the light emitted by the light emitting source 110 is visible when an observer is looking at a side view of the cap body 104. For instance, light emits out in a radial direction and/or non axial direction more brightly than a conventional light due to the light guide and reflective properties of the peripheral visibility ring.

In some embodiments, the filler 116 is used to seal the light cap 104, housing 106, or both. For instance, a filler such as a glue, epoxy, resin, plastic, etc., can be injected into the light cap 104. The filler, e.g., epoxy, can secure the spacer plug 108 to the light cap 104 and/or housing 106. The filler can also encapsulate the light emitting source 110 and/or encapsulate any exposed conductive elements, such as the first conductive lead wire 112 and/or the second conductive lead wire 114.

For instance, in an example embodiment, a filler 116 is deposited in the light cap 104 (e.g., light cap 104 only). Then, the light assembly 115 is positioned within the housing 106 such that the light emitting source 110C extends into and bonds with the filler 116. In some embodiments, at least a portion of the insulative projection of the spacer plug 108 can also extend into and bond with the filler 116. In yet additional embodiments, the first conductive lead wire 112 extends out the wire aperture 106B of the housing 106, and the second conductive lead wire 114 extends out the wire aperture 106B of the housing 106. Here, the filler 116, e.g., epoxy, can bond the light cap 104 to the housing 106, the filler 116 can bond the light cap 104 to the spacer plug 108 or any part thereof, the filler 116 can bond the light cap 104 to the light emitting source 110 or any part thereof, or any combination of the preceding. The filler 116 is described in greater detail herein.

In an example embodiment, the light string is manufactured according to a new process that automates and integrates wire bonding (e.g., splicing, contact crimping, welding, soldering, etc.), potentially ultrasonic welding, inserting filler, or any combination thereof, to manufacture a light string that is electrically sealed at each light element, so as to make the light string waterproof or at least water resistant.

A difference between the embodiment of FIG. 1A, FIG. 1B, FIG. 1E, FIG. 1F, and FIG. 1C, FIG. 1D is that the light cap 104 of FIG. 1A, FIG. 1B seats inside the light aperture 106A of the housing 106 and hence, seats within the housing 106. By comparison, the cap 104 of FIG. 1C, FIG. 1D secures to the housing 106 by slipping over the housing 106 adjacent to the light aperture 106A. In practice, various means can be utilized to secure the cap 104 to the housing 106, regardless of whether the cap 104 seats into the light aperture 106A of the housing 106 (like a plug—FIG. 1A, FIG. 1B, FIG. 1E, FIG. 1F), or whether the cap 104 extends over the housing 106 (like a lid—FIG. 1C, FIG. 1D). For instance, ultrasonic welding, glue, epoxy, crimping, thermal coupling, chemical bonding, mechanical bonding etc. can be utilized to couple the light cap 104 to the housing 106.

As will be described in greater detail herein, the light assembly 115 is coupled to the housing 106 such that the first conductive lead wire 112 and the second conductive lead wire 114 extend out from the wire aperture 106B of the housing 106. The light emitting source 110, when energized, emits light visible from outside the light cap 106, and the peripheral visibility ring 106C reflects light in a direction different from the light emitted by the light emitting source 110 such that the light emitted by the light emitting source 110 is visible when an observer is looking at a side view (peripheral view) of the light cap body 104A.

Light Cap

Figure 2:
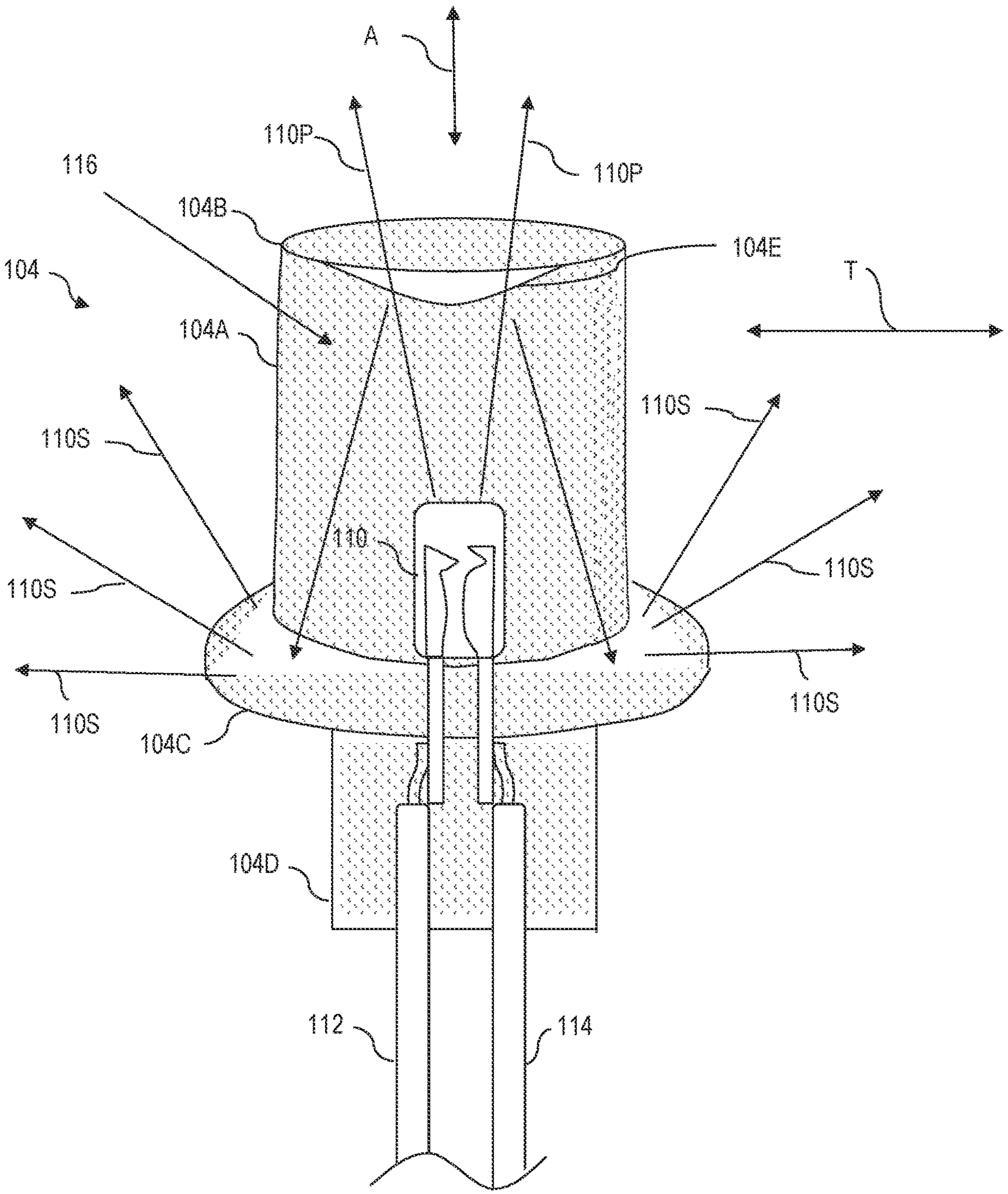
FIG. 2 illustrates the improved visibility provided by a peripheral reflector on the cap.

Referring to FIG. 2, the light cap 104 of FIG. 1B is illustrated solely for sake of example to clarify the reflective properties of the peripheral visibility ring 104C. As noted above, the light emitting source 110 is coupled to a first conductive lead wire 112 and a second conductive lead wire 114 in order to supply power to energize the light emitting source 110. The light emitting source 110 can be for example, an LED. Moreover, in some embodiments, the LED has a color, e.g., red, blue, green, yellow, white, purple, amber, etc.

A conventional LED emits a light directed generally forward, e.g., schematically represented by 110P. This makes seeing the light easy when viewed axially (along the axial axis A) such as by looking directly into the upper tip 104B of the light cap 104. However, the light and in particular, the color, is not vibrant when viewed from the side of the light cap 104, e.g., along the transverse axis T.

However, as noted more fully herein, the light cap 104 includes a non-opaque peripheral visibility ring 104C that scatters light reflected back from the upper tip 104B in various directions, including scattering light along the transverse axis T, and at angles between the transverse axis T and the axial axis A as schematically represented by light rays 110S.

In this regard, the filler 116 further defines a light guide that increases or otherwise enhanced the reflection of light out of the light cap 104 to increase color vividness and/or brightness in one or more non-axial dimensions well beyond conventional lights.

In some embodiments, the peripheral visibility ring 104C comprises a reflector. Here, light passes through the filler 116, which functions as a light guide, to the reflector such that a brightness of light viewed from a side of the cap body is similar to a brightness of light observed when viewing the upper tip (e.g., axial end view). In further embodiments, the upper tip 104B of the light cap 104 comprises a tip reflector 104E that reflects some light towards the peripheral visibility ring 104C through the light guide of the filler 116.

The light cap 104 can be manufactured such as via injection molding of a plastic material, or via other manufacturing methods.

As illustrated, the light cap 104 is non-opaque, e.g., clear, transparent, frosted, etc. Here, the light cap 104 allows light emitted from the light emitting source 110 to project through the light cap 104 and into the nearby environment.

For instance, referring back to FIG. 1A, FIG. 1B, FIG. 1C, FIG. 1D, FIG. 1E, FIG. 1F, in an example embodiment, the light emitting source 110 is positioned within the housing assembly (see housing assembly 102, FIG. 1A, FIG. 1B, FIG. 1C, FIG. 1D, FIG. 1E, FIG. 1F) such that light emitted from the light emitting source 110 shines out the light cap 104.

In an example embodiment, the securement 104D is inserted through the light aperture 106A and into the housing 106 such that the cap body 104A of the light cap 104 aligns axially with the light aperture 106A and the transition 104B is approximately adjacent to the light aperture 106A. In some embodiments, ultrasonic welding is used to join the securement 104D to the housing 106, e.g., around the entire circumference of the transition 104A, e.g., forming a first waterproof seal.

In another example embodiment, the securement 104D is inserted over the outer circumference of the housing 106 adjacent to the light aperture 106A (like a lid) such that the cap body 104A of the light cap 104 aligns axially with the light aperture 106A. In some embodiments, ultrasonic welding is used to join the securement 104D to the housing 106, e.g., around the entire circumference of the transition 104A, e.g., forming a first waterproof seal.

In some embodiments, an internal volume of the light cap 104 can be filled (or at least partially filled) with a filler, e.g., glue, and the glue can seal and secure the light cap 104 to the housing 106 either directly or indirectly, such as by bonding with the housing 106, with components of the light assembly, or both. For instance, a filler such as glue can adhere at least a portion of the light emitting source 110 and/or the spacer plug 108 to the light cap 104.

Referring generally to FIG. 1A-FIG. 2, in some embodiments, the light emitting source 110 comprises an LED. In some embodiments, the cap body 104A is hollow, thus enabling the LED to project from the housing 106 into the light cap 104 e.g., to receive the light source. In other embodiments, the cap body 104A can be partially filled or filled, e.g., with a filler 116, such as a clear material, plastic, resin, glue or other features, e.g., to create facets or other features that cause a desired illumination effect, to form a seal, to waterproof the connection between the light cap 104 and the housing 106, combinations thereof, etc.

In some embodiments, the light cap 104 can comprise a non-opaque bulb, and the filler can comprise an epoxy that at least partially fills an internal volume of the light cap 104. When the light emitting source 110 is pushed through the housing and into the hollow of the light cap 104, the light cap is epoxied to, and forms a water-tight seal with the light emitting source 110. Moreover, in some embodiments, the first contact of the light emitting source 110 is implemented as an anode lead that is electrically coupled (e.g., soldered) to a conductor of the first conductive lead wire 112, and the second contact of the light emitting source 110 is implemented as a cathode lead that is electrically coupled to a conductor of the second conductive lead wire 114. If the light emitting source 110 is pushed sufficiently far into the light cap 104, the epoxy can coat at least a portion of the anode lead and the cathode lead that extend into the light cap. Thus, in some configurations, the epoxy bonds the first conductive lead wire 112 and the second conductive lead wire 114 (at least those portions that extend into the light cap 104) to the spacer plug 108.

In some embodiments, the filler comprises an epoxy that fills the light cap 104 and does not fill the housing 106. Providing epoxy in the light cap 104 provides advantages when used with automated manufacturing equipment because the light cap 104 can be mechanically joined to the housing 106, and then the light cap 104 (only) can be filled with glue thus easing tolerances required by the manufacturing environment.

Housing

Figure 3:
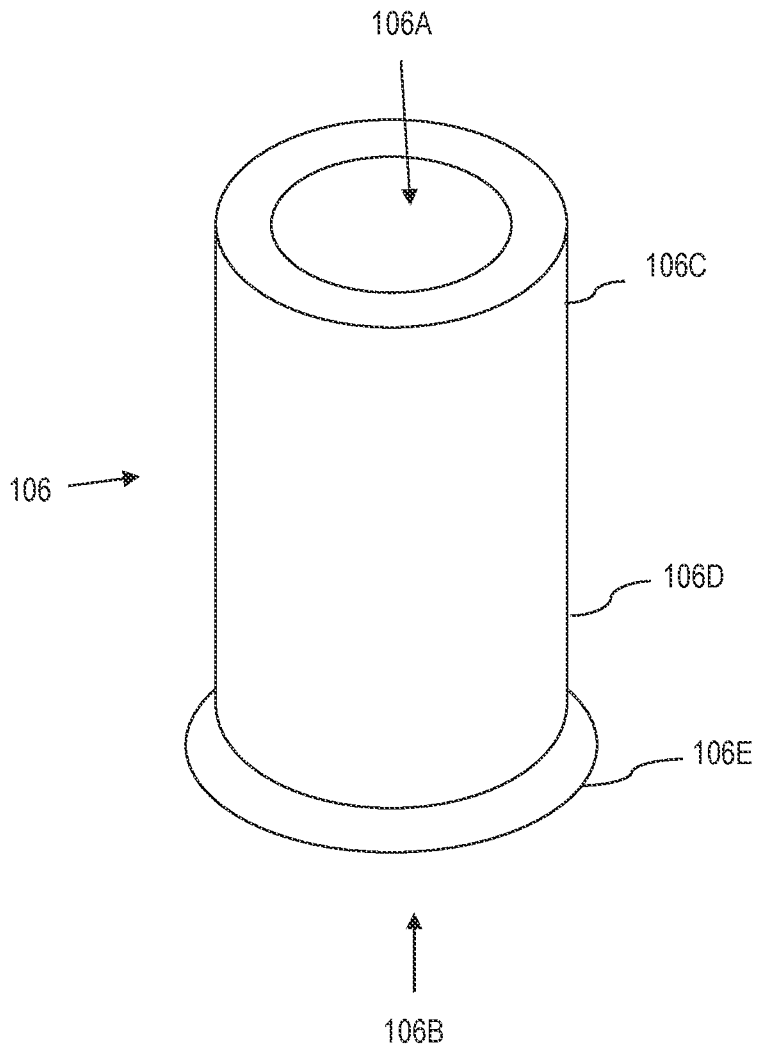
FIG. 3 illustrates a housing according to aspects herein.

Referring to FIG. 3, an example embodiment is provide of the housing 106. The housing 106 is analogous to the housing 106 of FIG. 1A-FIG. 1D unless otherwise noted.

As illustrated, the housing 106 includes a generally cylindrical housing portion that is bored out axially so as to have a passageway therethrough, thus defining a generally tube shape. The housing 106 is shown as having a light aperture 106A, shown as a first opening of the passageway towards the top of the housing 106. Correspondingly, the housing includes a wire aperture 106B, shown as a second opening of the passageway towards the bottom of the housing 106. In this example, the light aperture 106A is opposite the wire aperture 106B.

The housing 106 is also illustrated as having a first body portion 106C adjacent to the light aperture 106A, and a second body portion 106D adjacent to the wire aperture 106B. The second body portion 106D is shown as having an optional flange 106E about the circumference of an end face of the housing 106 proximate to the wire aperture 106B. The optional flange 106E can be utilized to ease manufacturing, e.g., providing a feature that enables automation to orient, pick up, or otherwise manipulate the housing 106 in mass-production machinery.

Through Passageway

Figure 4A:
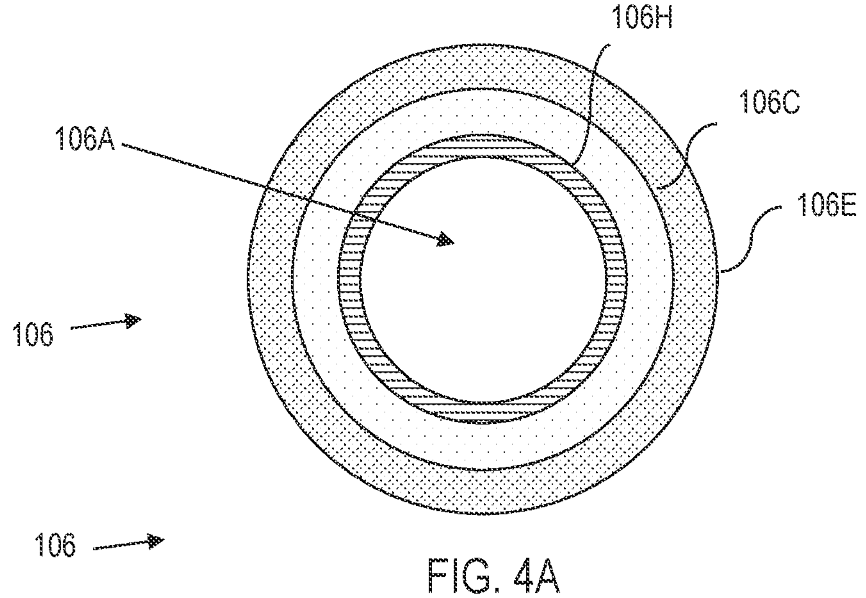
FIG. 4A illustrates a top view of an example housing showing a groove-less configuration.
Figure 4B:
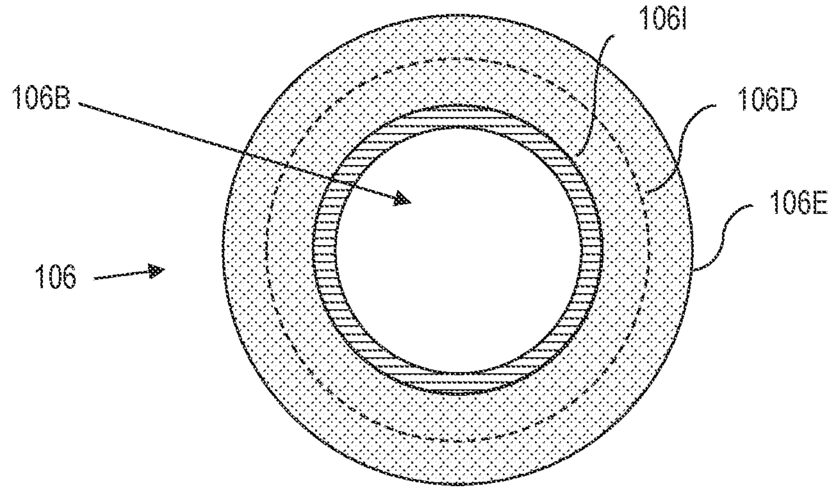
FIG. 4B illustrates a bottom view of the housing of FIG. 4A.

Referring briefly to FIG. 4A and FIG. 4B, views are provided looking through the passageway of an example housing 106, e.g., having an outer configuration analogous to that of FIG. 3, according to various aspects herein. Although illustrated with the outer configuration of FIG. 3, the inside view can be applied to any of the embodiments described with reference to FIG. 1A-FIG. 1G.

Moreover, the internal passageway is generally round for sake of clarity of illustration. However, in practice, the apertures, passageway, or other features can correspond, for example, to the shape of any assembly features, e.g., analogous to the assembly feature 104D of FIG. 2; analogous to the wire aperture 106B of FIG. 3, etc.

FIG. 4A is a top view looking into the light aperture 106A. Looking top down, the end face of the first body portion 106C is slightly smaller in diameter than the optional flange 106E. Also illustrated, inside the passageway is an optional, thin wall 106H. The optional thin wall 106H is recessed into the passageway from the end face of the first body portion 106C and can be implemented as a ring or cylinder. By way of example, when utilized, the optional thin wall 106H can function as a first stop recessed into the passageway to set a depth of insertion of the light cap 104 into the light aperture 106A of the body 106.

FIG. 4B is a bottom view of the housing 106 of FIG. 3. In this view, the flange 106E is shown as being flush with the end face of the housing 106 proximate to the second body portion 106D. Also shown is an optional thin wall 106I. The optional thin wall 106I is recessed into the passageway from the end face of the second body portion 106D and can be implemented as a ring or cylinder. By way of example, when utilized, the optional thin wall 106I can function as a second stop recessed into the passageway to set a depth of insertion of the spacer plug 108 into the passageway of the housing 106 through the wire aperture 106B.

Referring to FIG. 4A and FIG. 4B generally, the thin wall 106H and thin wall 1061 can form part of the same structure, e.g., a cylindrical inward projection from the sidewall of the passageway. In other embodiments, the thin wall 106H and thin wall 106I are separate structures.

Wire Groove Example Embodiment

Figure 5:
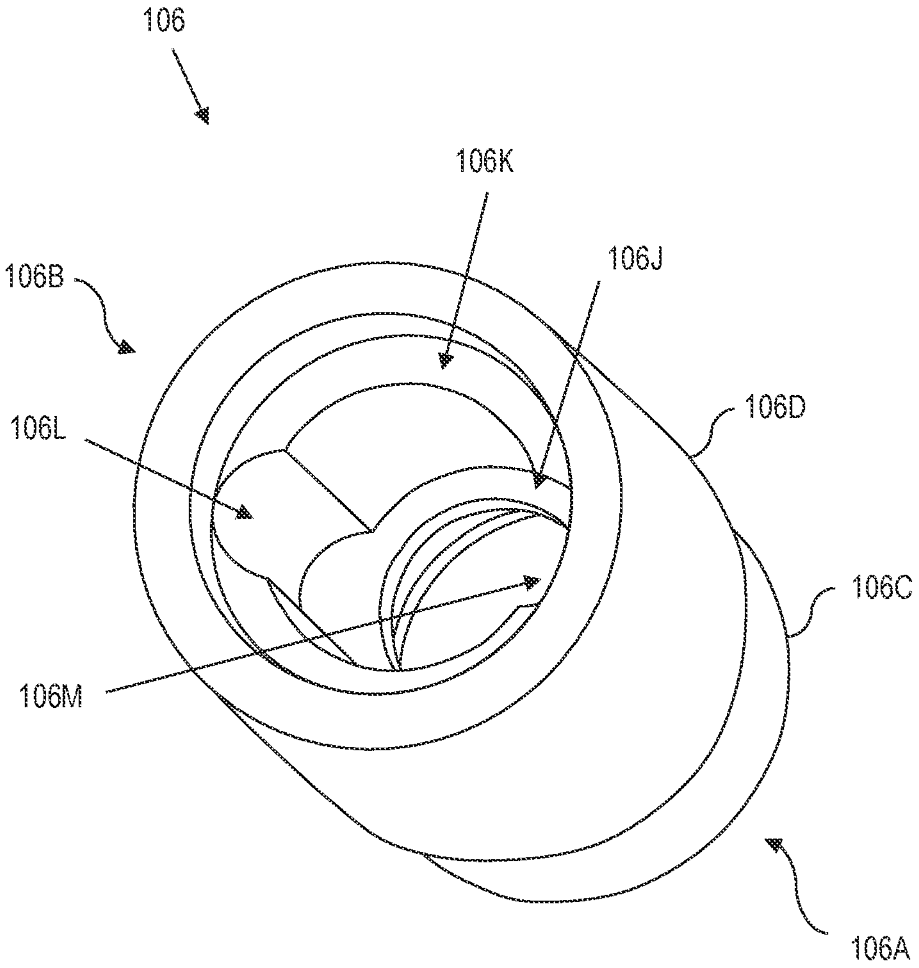
FIG. 5 illustrates another example housing having a grooved internal surface.

Referring to FIG. 5, in some embodiments, an optional wire groove can be provided within the passageway of the housing 106. The embodiment illustrated in FIG. 5 uses the housing 106 of FIG. 3, solely for illustration, and the concepts discussed below can be adapted to any housing configuration.

The housing 106 is shown as having a light aperture 106A and a wire aperture 106B, analogous to that described previously herein. The housing 106 is also illustrated as having a first body portion 106C adjacent to the light aperture 106A, and a second body portion 106D adjacent to the wire aperture 106B, analogous to that previously described. As illustrated, the light aperture 106A and the wire aperture 106B form part of a passthrough of a passageway that axially passes through the center of the housing 106, thus forming a tube-like structure. In the example embodiment, the housing 106 also includes an inner baffle 106J approximately centered axially along the length of the housing 106. The baffle includes a through hole that forms part of the passageway. The baffle 106J also provides an abutment surface, e.g., to function as a stop for installing the light cap 104 (FIG. 1A) into the housing 106 via the light aperture 106A (or installing the light cap 104 over the housing 106 so as to extend over the light aperture 106A—FIG. 1D), and/or for installing the spacer plug 108 (FIG. 1A-FIG. 1D) into the housing 106 via the wire aperture 106B.

Within the wire aperture 106B, the housing 106 also comprises a recessed inner tube 106K that extends inward to the baffle 106J. In an example embodiment, the inner tube 106K includes a sidewall thickness, which can be, for example, at least approximately ½ the thickness of a wire (including insulating sheath) intended for use with the corresponding light string (e.g., first conductive lead wire 112, and second conductive lead wire 114, FIG. 1A, FIG. 1B, for example). Moreover, the thickness of and end-face of the inner tube 106K can define a "seat" that receives a base portion of the spacer plug 108 (not shown) as described more fully herein. In practical applications, the entire housing 106 can be injection molded or otherwise machined, such that the inner tube 106K need not be a separate component, but rather merely refers to the difference in internal diameter through the passageway.

In this regard, the inner tube 106K thus also includes at least one groove 106L axially extending along the length of the inner tube 106K, which cuts into the sidewall and provides a space for a conductive wire of the light string. By way of example, in the case of a series connection, the inner tube 106K can include a first groove 106L and a second groove 106M. In other embodiments, such as where parallel wiring is provided, there may be three or more grooves. As will be described in greater detail herein, the grooves facilitate coupling the conductive wires and the spacer plug 108 (FIG. 1A, FIG. 1B) to the housing 106 in a manner that enables forming a seal, e.g., a waterproof or water tight assembly.

Figure 6A:
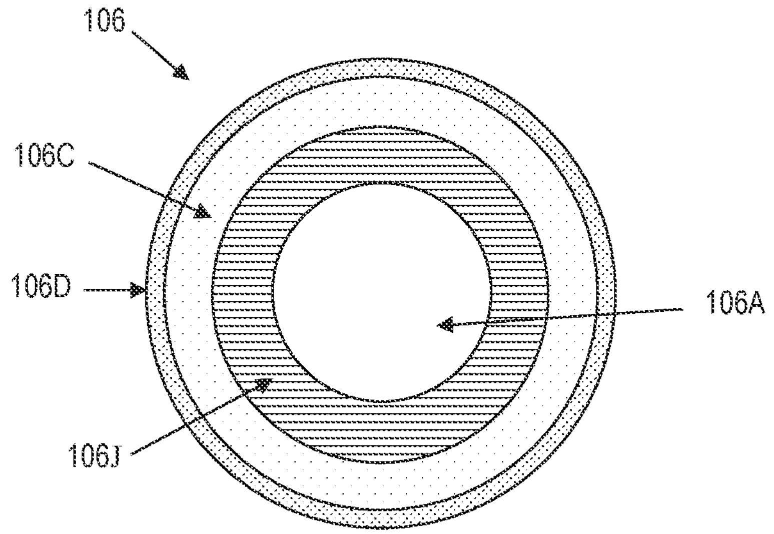
FIG. 6A is a top end view of the housing of FIG. 5.

Referring to FIG. 6A, a top view of the housing 106 (FIG. 4) is illustrated. As noted above, the housing 106 includes a light aperture 106A. Also shown, the housing 106 includes a first body portion 106C and a second body portion 106D. In the non-limiting example embodiment illustrated, the second body portion 106D is slightly larger in diameter than the first body portion 106C, and is thus visible in this top view. FIG. 6A also illustrates the baffle 106J on the light cap-side of the housing 106, which can be used to provide a stop or abutment surface, such as when installing the light cap 104 into the light aperture 106A of the housing 106 (FIG. 1A).

Figure 6B:
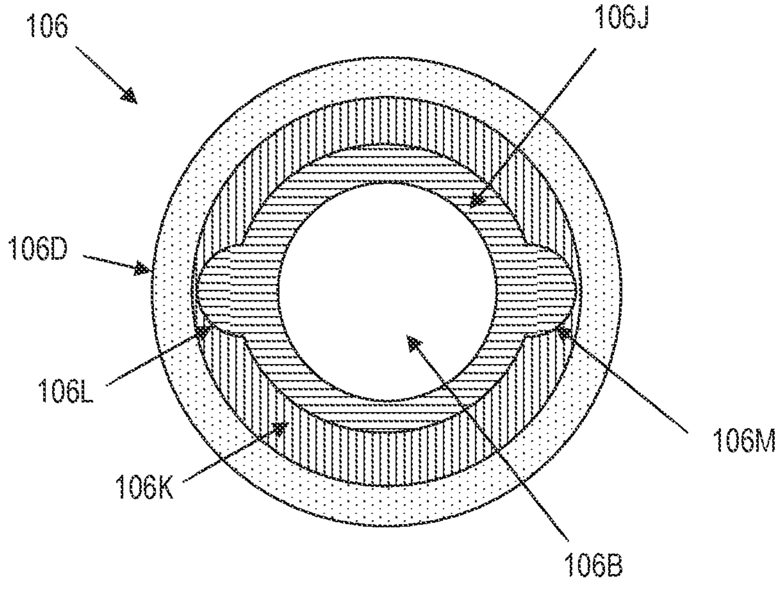
FIG. 6B is a bottom end view of the housing of FIG. 5 in an embodiment that is useful for serial wiring.

Referring to FIG. 6B, a bottom view of the example housing 106 of FIG. 5 is provided, which can be used for example, with a series wiring configuration. As illustrated, the wire aperture 106B provides a passageway recessing into the second portion 106D. FIG. 6B also illustrates the baffle 106J on the spacer plug-side of the housing 106. FIG. 6B also clarifies the configuration of the example inner tube 106K, with the first groove 106L and the second groove 106M axially channeled into the inner tube 106K, and stopping at the baffle 106F, by way of example.

Figure 6C:
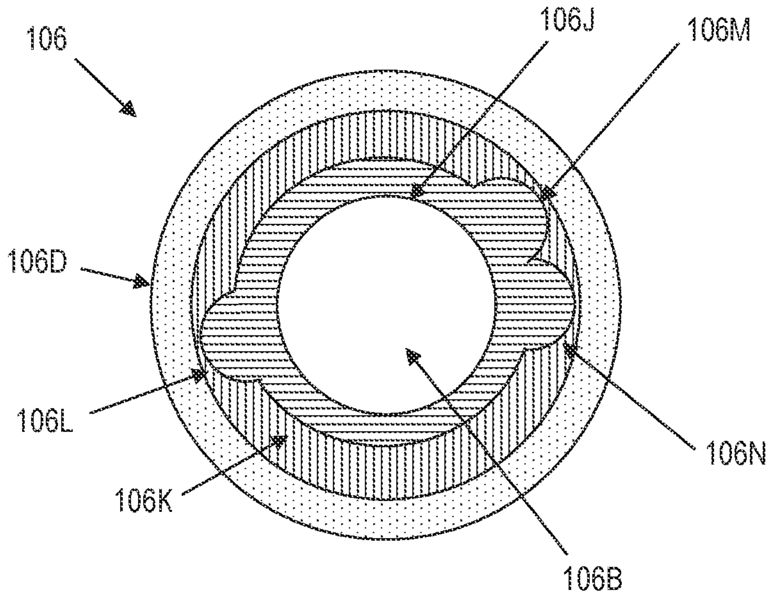
FIG. 6C is a bottom end view of an alternative configuration for the housing of FIG. 5 that is useful with parallel wiring.

Referring to FIG. 6C, a bottom view of an alternative example housing 106 is illustrated. The housing is similar to the embodiment of FIG. 6B. For instance, as illustrated, looking through the wire aperture 106B adjacent to the second body portion 106D, the baffle 106K can be seen, as well as the inner tube 106K. However, unlike the embodiment of FIG. 6B, which shows the inner tube 106K as having a first groove 106L, and second groove 106M, the embodiment of FIG. 6C adds a third groove 106N axially channeled into the inner tube 106K. The provision of the third groove 106N enables parallel wiring.

Spacer Plug

Referring to FIG. 7A, FIG. 7B, FIG. 7C, and FIG. 7D, example spacer plugs 108 are illustrated according to further embodiments herein. The spacer plugs are identical in function unless otherwise noted. For instance, the spacer plug 108 of FIG. 7A, FIG. 7B has three channels for supporting up to three conductive wires, e.g., for wiring in parallel. On the other hand, the spacer plug 108 of FIG. 7C and FIG. 7D includes only two channels, more analogous to the spacer plug of FIG. 7A-7B.

Referring to FIG. 3A-FIG. 7D generally, as illustrated, the end portion 108A is cylindrical and is dimensioned to seat into the wire light aperture 106B of the housing 106 (e.g., see example embodiments, FIG. 3A-FIG. 6C). Moreover, in embodiments of the housing 106, such as that shown in FIG. 5, the end portion 108A has a thickness that allows the end portion 108A to rest on the end face of the inner tube 106K. The body portion 108B seats into the inner tube 106K within the housing 106. The arm 108C provides an insulative spacer to space apart conductive lead wires that couple to respective contacts of a light emitting source as described more fully herein.

Figure 7A:
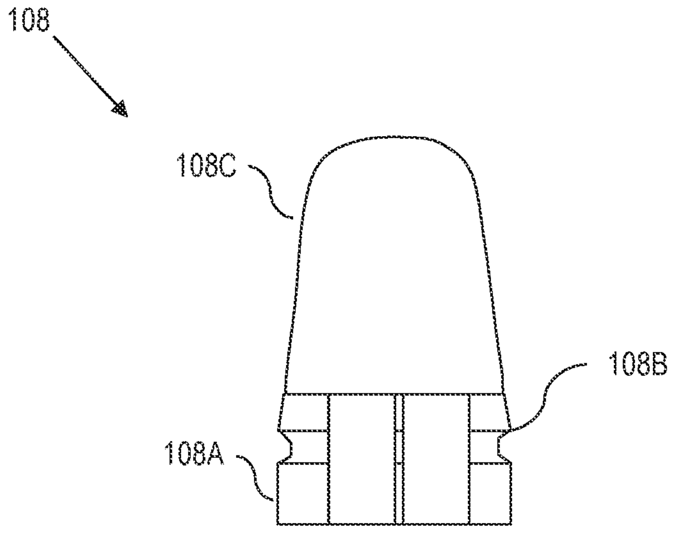
FIG. 7A is another example spacer plug.

FIG. 7A also illustrates that the spacer plug 108 includes a set of channels, including a first channel 108D, and a second channel 108E (analogous to the spacer plug described with reference to FIG. 7A-7B).

Figure 7B:
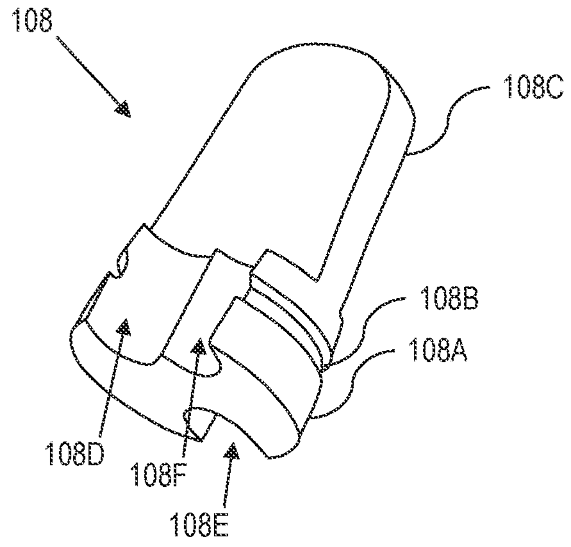
FIG. 7B is a perspective view of the spacer plug of FIG. 7B.

However, the spacer plug of FIGS. 7A and 7B includes a third channel 108F, which makes parallel wiring more convenient. Each of the channels receive, restrain, support, combinations thereof, etc., a corresponding conductive lead wire used to power the light emitting source. This can provide consistent wire positioning, strain relief, and ensure that electrical shorts are avoided.

Figure 7C:
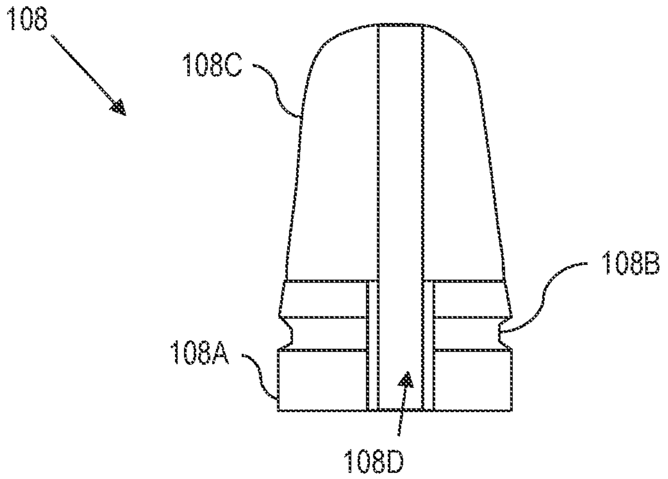
FIG. 7C is yet another example spacer plug.
Figure 7D:
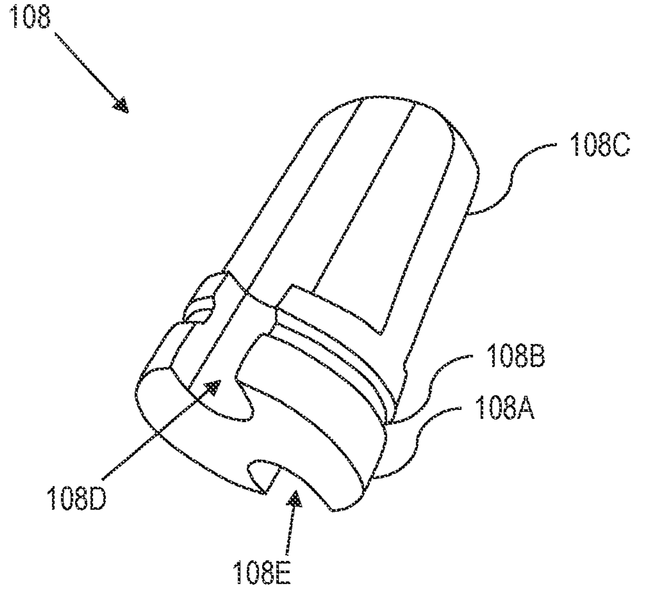
FIG. 7D is a perspective view of the spacer plug of FIG. 7C.

As illustrated in FIG. 7C and FIG. 7D, a channel for the wires can extend all the way up the arm 108C. Such a configuration can help with strain relief, and can help to secure the wire to the illumination source.

Although three channels are illustrated in the corresponding spacer plugs 108 of FIG. 7A, FIG. 7B, in practical applications, there is one channel for each conductive lead wire electrically connected within the housing 106. Thus, for different wiring schemes, the spacer plug 108 can configured to include as many channels as needed. Also illustrated, the insulative arm 108C of FIG. 7A-FIG. 7D is rounded, which can assist manufacturing processes by not having sharp corners to catch on automation machinery.

In yet other embodiments, such as where every light is in parallel, the spacer plug 108 can include four channel grooves, two per side (a first wire and a second wire each connected to the anode, and a third wire and a fourth wire each connected to the cathode, each wire in a respective channel groove.

Miscellaneous

In an example embodiment, a light string can include a mix of series and parallel wired sections of lights. In this example embodiment, a mix of spacer plugs 108 can be used to accommodate the required number of wires for a given design. By way of a first example, a light string can include a plurality of subsets of lights, each subset wired in series, and each of the subsets wired in parallel. That is, each subset of lights can include X (any integer) e.g., two to ten lights that are wired in series. Each subset is wired in parallel. Certain lights, e.g., those forming a junction with a parallel circuit may require three wires, whereas each light within the series subset only requires two wires.

Assume for example, a simplified string with 6 lights, two subsets of three series lights each. Lights 1 and 3 will each require three wires, whereas Light 2 and Lights 4-6 only need two wires each.

Briefly, a spacer plug 108, e.g., such as disclosed in FIGS. 7A, 7B can used with Light 1 and with Light 3.

The anode of the LED of Light 1 electrically couples to a first wire and a second wire. When Light 1 is assembled, the first wire (e.g., which can also electrically couple to power) is oriented in channel 108D of a corresponding spacer plug 108. The second wire is oriented in channel 108F of the spacer plug 108 and will connect to the parallel circuit, i.e., the second wire further electrically couples to the anode of the LED of Light 4. A third wire electrically couples to the cathode of the LED of Light 1, and is oriented in channel 108E of the spacer plug. The third wire also electrically couples to the anode of the LED of Light 2.

The cathode of the LED of Light 3 electrically couples to a fourth wire and a fifth wire. When Light 3 is assembled, the fourth wire (e.g., which can also electrically couple to power) is oriented in channel 108D of a corresponding spacer plug. The fifth wire is oriented in channel 108F of the spacer plug 108, and further electrically couples to the cathode of the LED of Light 6. A sixth wire electrically couples to the anode of the LED of Light 3, and is oriented in channel 108E of the spacer plug. The sixth wire also electrically couples to the cathode of the LED of Light 2. Here, the spacer plug 108 of Light 3 is in “reverse” of the spacer plug 108 of Light 1 relative to the corresponding LED.

For Light 2, a spacer plug 108 such as that shown in FIG. 7C and FIG. 7D can be utilized. When Light 2 is assembled, the third wire electrically couples the anode of the LED of Light 2 to the cathode of the LED of Light 1 as noted above. The third wire is oriented in channel 108D of a corresponding spacer plug 108 of Light 2. The sixth wire electrically couples the cathode of the LED of Light 2 to the anode of the LED of Light 3 as noted above. The sixth wire is oriented in channel 108E of the corresponding spacer plug 108.

For the series string of Light 4, Light 5, and Light 6, a spacer 108 such as that shown in FIG. 7C and FIG. 7D can be utilized.

When Light 4 is assembled, the second wire electrically couples the anode of the LED of Light 4 to the anode of the LED of Light 1 as noted above. The second wire is oriented in channel 108D of a corresponding spacer plug 108. A seventh wire electrically couples the cathode of the LED of Light 4 to the anode of the LED of Light 5. The seventh wire is oriented in channel 108E of the corresponding spacer plug 108.

When Light 5 is assembled, the seventh wire electrically couples the anode of the LED of Light 5 to the cathode of the LED of Light 4 as noted above. The seventh wire is oriented in channel 108D of a corresponding spacer plug 108. An eighth wire electrically couples the cathode of the LED of Light 5 to the anode of the LED of Light 6. The eighth wire is oriented in channel 108E of the corresponding spacer plug.

When Light 6 is assembled, the eighth wire electrically couples the anode of the LED of Light 6 to the cathode of the LED of Light 5 as noted above. The eighth wire is oriented in channel 108D of a corresponding spacer plug 108. The fifth wire electrically couples the cathode of the LED of Light 6 to the cathode of the LED of Light 3 as noted above. The fifth wire is oriented in channel 108E of the corresponding spacer plug 108.

As an example implementation, the above pattern is repeated for each subset of series/parallel lights. That is, each light that connects to two anodes and a single cathode, or to two cathodes and a single anode can use the spacer plug of FIGS. 7A, 7B. Each light where the anode and cathode each connect via a single wire can use the spacer plug of FIGS. 7C, 7D.

Housing/Spacer Plug Alignment

Referring to the FIGURES generally, in some embodiments, when the spacer plug 108 is inserted into the housing 106, the spacer plug 108 includes channels to receive the lead wires, thus defining a first slot and a second slot. In a configuration of the housing 106 such as illustrated with regard to FIG. 5, FIG. 6A, and FIG. 6B, with the spacer plug 108 is suitably aligned therewith, a first groove 106L of the housing 106 aligns with a first channel 108D of the spacer plug 108 to define a first slot. Analogously, a second groove 106M within the housing aligns correspondingly with a second channel 108E of the spacer plug 108 to define a second slot. In the case of a parallel wiring, a third groove 106N within the housing 106 aligns with a third channel 108F of the spacer plug 108 to define a third slot.

In alternative configurations, e.g., as shown in FIG. 4A, 4B, there is no requirement that the housing include slots, channels or other features to accommodate the lead wires, such as where the spacer plug 108 includes features that accommodate the lead wires.

Regardless of configuration, a first conductive lead wire extends into the housing through the wire aperture and first slot. The first conductive lead wire is secured within the housing, e.g., adjacent to a first side of the spacer plug and is electrically coupled to the first contact of the light emitting source. Analogously, a second conductive lead wire extends into the housing through the wire aperture and second slot. The second conductive lead wire is secured within the housing, e.g., adjacent to a second side of the spacer plug and is electrically coupled to the second contact of the light emitting source. In the case of parallel wiring, a third conductive lead wire extends into the housing through the wire aperture and optional third slot. The third conductive lead wire is secured within the housing, e.g., adjacent to either the first or second side of the spacer plug and is electrically coupled to the second contact of the light emitting source.

Light Assembly/Light String

Figure 8:
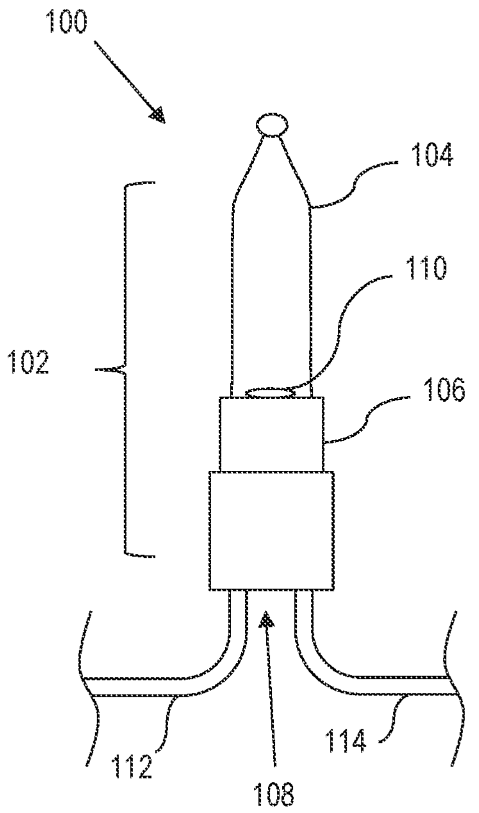
FIG. 8 is a schematic view of a light assembly.
Figure 9:
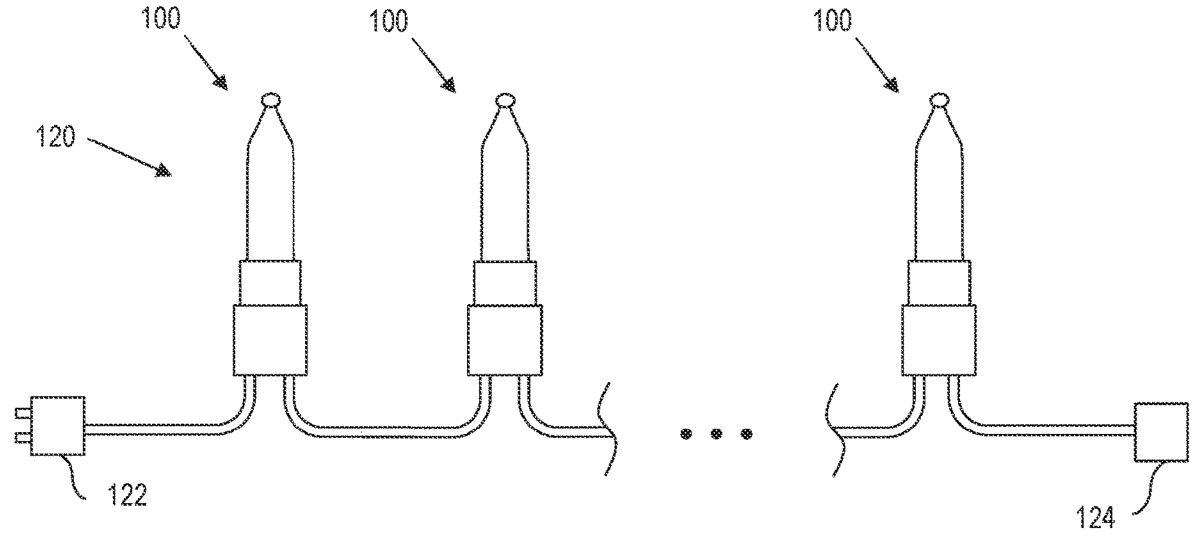
FIG. 9 is a schematic view of a light string comprising a plurality of light assemblies.

Referring to FIG. 8 and FIG. 9 generally, an example light assembly and light string is illustrated. Each light assembly 100 forms part of an overall light string.

Referring initially to FIG. 8, analogous to the previous embodiments, each light assembly 100 includes a housing assembly 102, that is made up of a light cap 104, a housing 106, and a spacer plug 108. The light cap 104 is coupled to and extends from the housing 106 adjacent to the top as illustrated, and the spacer plug 108 is inserted into the bottom of the housing 106 as illustrated.

A light emitting source 110 is positioned within the housing assembly 102. A first conductive lead wire 112 extends into the housing 106 (e.g., through the wire aperture 106B, FIGS. 3A-3D), and is electrically connected to the light emitting source 110. Also, a second conductive lead wire 114 is electrically connected to the light emitting source 110.

FIG. 9 illustrates a light string 120, which includes a repeating pattern of connected light assemblies 100. The illustrated light string 120 includes an electrical plug 122 at the start of the light string, and an electrical socket 124 at the terminating end of the light string. Although shown as wired in series for simplicity, any combination of series and parallel wiring may be implemented.

By way of example, in an illustrative implementation of lights wired in series, there can be between up to 50 or more lights wired in series (e.g., 25-50 more preferably). Each light may be any desired distance apart, but a spacing of approximately up to four inches (approximately 10.16 centimeters) works well for many applications requiring decorative string lights.

Referring to FIGS. 1-9 generally, a light string is illustrated, which is comprised of a set (e.g., up to 50 or more light assemblies). Each light assembly includes a housing assembly, a light emitting source, a first conductive lead wire, and a second conductive lead wire. The housing assembly comprises a housing having a light aperture and a wire aperture, a light cap coupled to and extending from the housing adjacent to the light aperture, and a spacer plug having an insulative projection, wherein the spacer plug is positioned within the housing, e.g., inserted into the wire aperture.

The light emitting source is positioned within the housing assembly and emits light when energized by a suitable power source, e.g., standard wall voltage (E.g., 120V AC). The light emitting source has a first contact (e.g., pad, conductive leg, etc., coupled to an LED anode), a second contact (e.g., pad, conductive leg, etc., coupled to the LED cathode), and a light emitter (e.g., light emitting diode) coupled to the first contact and the second contact. Where wire legs are provided, the first contact is also referred to herein as an anode leg or anode lead and the second leg is analogously referred to herein as a cathode leg or cathode lead.

The first conductive lead wire extends into the housing through the wire aperture. Here, the first conductive lead wire is secured within the housing adjacent to a first side of the spacer plug and is electrically coupled (e.g., soldered, welded, electrically connected via mechanical bonding such as crimping or splicing, adhesive, etc.) to the first contact (e.g., anode lead) of the light emitting source. Similarly, the second conductive lead wire extends into the housing through the wire aperture. The second conductive lead wire is secured within the housing adjacent to a second side of the spacer plug and is electrically coupled (e.g., soldered, welded, electrically connected via mechanical bonding such as crimping or splicing, adhesive, etc.) to the second contact (e.g., cathode lead) of the light emitting source.

In this configuration, the insulative projection of the spacer plug is seated between the first conductive lead wire and the second conductive lead wire within the housing so as to prevent a direct electrical short between the first conductive lead wire and the second conductive lead wire.

Method of Manufacture

Figure 10:
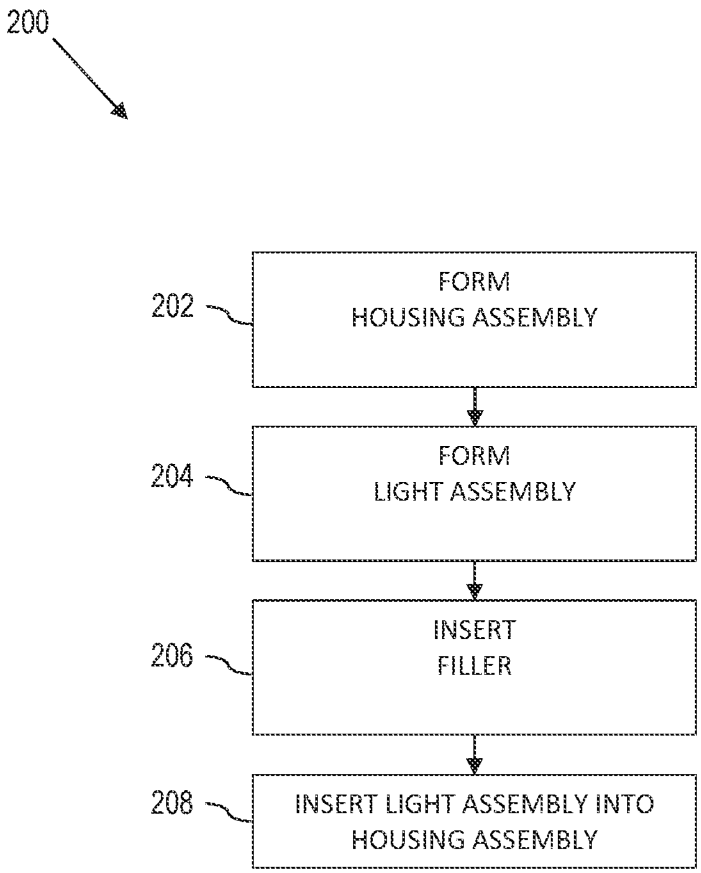
FIG. 10 is a flow chart illustrating a method of manufacturing a light string.

Referring to FIG. 10, a method 200 of manufacturing a light string is provided. The method 200 uses the component parts described more fully herein with reference to the preceding FIGURES.

The method comprises forming a housing assembly at 202. By way of example, a housing assembly can be formed by coupling a light cap having a hollow therein to a housing such that the light cap extends from the housing and the hollow of the light cap aligns axially with a light aperture of the housing. As described more fully herein, in some embodiments, this can be carried out by inserting a light cap into a light aperture of a housing such that the light cap is coupled to, and extends from the housing adjacent to the light aperture, e.g., as described more fully herein with reference to preceding FIGURES.

The method also comprises forming a light assembly at 204. By way of example, a light assembly can be formed by coupling a first conductive lead wire to a first contact of a light emitting source so as to form a first electrical connection and coupling a second conductive lead wire to a second contact of the light emitting source so as to form a second electrical connection. Here, the light emitting source can further comprise a light emitter electrically connected to the first contact and the second contact. The light assembly is further formed by inserting a spacer plug between the first conductive lead wire and the second conductive lead wire so that an insulative projection of the spacer plug separates the first conductive lead wire from the second conductive lead wire. By way of further example, electrical coupling can be carried out by soldering the conductive lead wires to legs of an LED.

The method additionally comprises inserting at 206, a filler. The method yet further comprises inserting at 208, the light assembly into the housing assembly.

By way of example, the method may comprise filling a hollow of the light cap with epoxy, filling the housing with the epoxy, or a combination thereof. As a practical example, the method may be carried out by inserting the light assembly into the housing assembly through a wire aperture of the housing that is opposite the light aperture in the housing, such that the light emitter of the light emitting source extends into the filler in the light cap, at least a portion of the insulative projection of the spacer plug extends into the filler in the light cap, and the filler bonds the spacer plug and the light emitting source to the light cap.

For instance, in some embodiments, the light cap comprises a non-opaque bulb and the filler comprises a epoxy that fills an internal volume of the light cap such that the light cap is epoxied to, and forms a water-tight seal with the light emitting source, spacer plug, or both. In some embodiments, the filler comprises a epoxy that fills the housing and/or light cap sufficient to cover and coat the light emitting source.

In an example embodiment, the filler is deposited in the light cap. For instance, the filler may comprise a epoxy that fills the light cap and does not fill the housing. The light assembly is then coupled to (e.g., positioned within) the housing such that the light emitting source extends into and bonds with the filler, at least a portion of the insulative projection extends into and bond with the filler, the first conductive lead wire extends out the wire aperture of the housing, and the second conductive lead wire extends out the wire aperture of the housing.

In some embodiments, the first contact of the light emitting source is implemented as an anode lead that is electrically coupled (e.g., spliced, contact crimped, welded, soldered, etc.) to a conductor of the first conductive lead wire, and the second contact of the light emitting source is implemented as a cathode lead that is electrically coupled (e.g., spliced, contact crimped, welded, soldered, etc.) to a conductor of the second conductive lead wire. Here, the epoxy can optionally coat the anode lead and the cathode lead within the housing. The epoxy can further bond the first conductive lead wire and the second conductive lead wire to the housing and/or to the spacer plug.

In some embodiments, inserting filler into the light cap comprises filling a hollow of the light cap with epoxy such that the epoxy dries clear so as to allow light from the light emitting source to escape the light cap. Here, the epoxy can bond the light cap to the light emitting source, the epoxy can bond the light cap to the spacer plug, the epoxy can bond the light cap to the housing, or a combination thereof. Moreover, the spacer plug can bond to the light cap so as to secure the housing in place.

In some embodiments, the filler comprises a epoxy that at least partially fills an internal volume of the light cap such that the light cap is epoxied to, and forms a water-tight seal with the light emitting source. In some embodiments, the epoxy coats at least a portion of the anode lead and/or the cathode lead that extend into the light cap. Still further, in some embodiments, the epoxy bonds the first conductive lead wire and the second conductive lead wire that extend into the light cap to the spacer plug. Yet further, in some embodiments, the epoxy fills the light cap such that any exposed conductor within the light cap is covered by the epoxy sufficient to form a waterproof seal.

As yet a further example, the filler can comprise epoxy that fills a hollow in the light cap and bonds the light cap to a light emitting diode, and the epoxy coats the anode lead and the cathode lead within the light cap.

In yet another example configuration, a hollow of the housing includes a seat that creates an internal abutment surface, the spacer plug includes an end portion forming a base for the insulative projection, and the filler comprises a epoxy that bonds to at least a portion of the insulative projection such that the end portion of the spacer plug is adjacent the seat within the housing, thus securing the housing in place between the light cap and the end portion of the spacer plug.

In other embodiments, the epoxy can bond the light cap to the housing, the epoxy can bond the spacer plug to the housing, the epoxy can bond to the first lead wire and the second lead wire within the housing, combinations thereof, etc. In this regard, the internal volume of the housing can be sealed, e.g., making electrical connections within the housing waterproof, water-resistant, etc. Moreover, the filler, e.g., epoxy, can seal, encapsulate, cover, fix, secure, combinations thereof, components of a light string so as to make a durable, and rugged light string that is suitable for use even outdoors.

Depending upon how the manufacturing is carried out, it may be preferable to insert the light assembly at 208 before inserting the filler at 206. In other embodiments, it may be more beneficial to insert the filler at 206 before inserting the light assembly at 208.

According to further aspects herein, a method of manufacturing a light string comprises electrically connecting a first conductive lead wire to a first contact of a light emitting source, and electrically connecting a second conductive lead wire to a second contact of the light emitting source. The method further comprises securing a light cap to a housing, and isolating the first conductive wire from the second conductive wire using a spacer plug. The method yet further comprises inserting the light emitting source into the housing, and inserting a filler into the housing so as to seal electrical connections within the housing.

In some embodiments, the first conductive wire may be sheathed in an insulator. Analogously, the second conductive wire may be sheathed in an insulator. In this instance, the method may comprise obtaining the first conductive lead wire having an insulation thereon, obtaining the second conductive lead wire having an insulation thereon, stripping a section of the insulation off an end of the first conductive lead wire exposing a conductive wire, and stripping a section of the insulation off an end of the second conductive lead wire exposing a conductive wire. Here, the spacer plug can include a first channel and a second channel therealong. The first channel receives the insulator of the first conductive wire and the second channel receives the insulator of the second conductive wire.

In some configurations, the light emitting source comprises a light emitting diode (LED), the first contact comprises a conductive leg electrically connected to the LED anode defining an anode leg, and the second contact comprises a conductive leg electrically connected to the LED cathode defining a cathode leg. In this configuration, the method further comprises soldering the first conductive wire to the anode leg of the LED, and soldering the second conductive wire to the cathode leg of the LED.

In still another embodiment, a method of manufacturing a light string comprises obtaining a first conductive lead wire, the first conductive lead wire having an insulation thereon, and stripping a section of the insulation off an end of the first conductive lead wire exposing a conductive wire. The method comprises obtaining a second conductive lead wire, the second conductive lead wire having an insulation thereof, and stripping a section of the insulation off an end of the second conductive lead wire exposing a conductive wire.

The method also comprises coupling the first conductive lead wire and the second conductive lead wire to a light emitting source having a first contact and a second contact, e.g., by electrically coupling the first conductive lead wire to the first contact of the light emitting source, and electrically coupling the second conductive lead wire to the second contact of the light emitting source.

For instance, as noted in greater detail herein, the light emitting source can comprise an LED, incandescent, or other form of light. In the case of an LED, the first contact can comprise a conductive leg electrically connected to the LED anode defining an anode leg, and the second contact can comprise a conductive leg electrically connected to the LED cathode defining a cathode leg. Thus, the first conductive wire is electrically connected to the anode leg of the LED, and the second conductive wire is electrically connected to the cathode leg of the LED. Electrical connection is implemented by soldering. However, other forms of electrical connection may be implemented, including crimping, welding, gluing, or any other suitable technique.

Figure 11A:
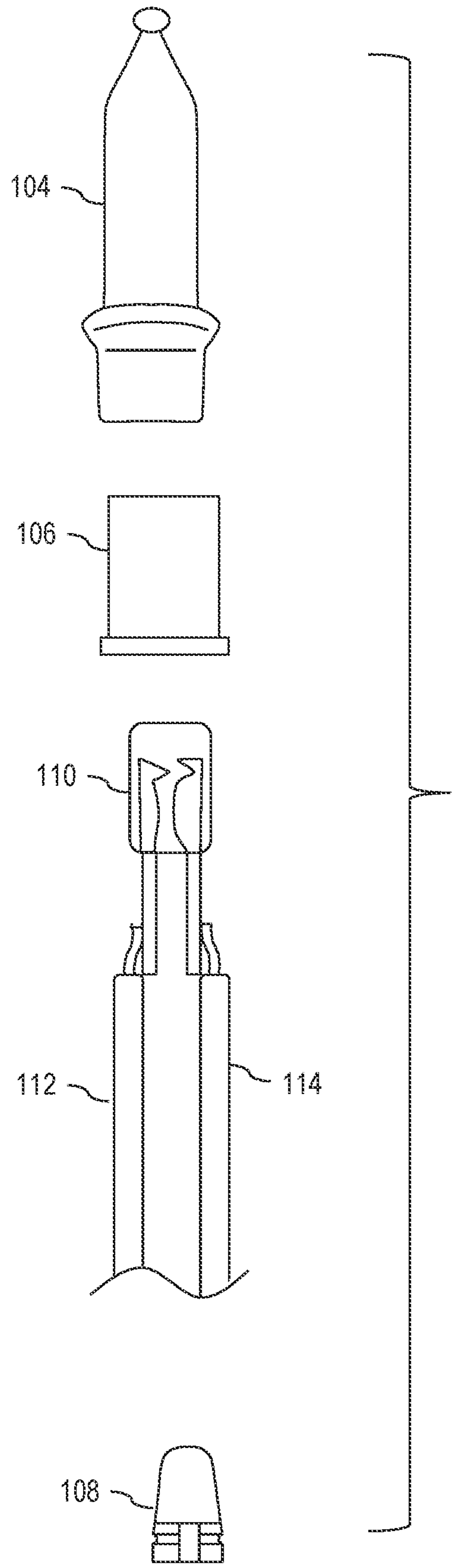
FIG. 11A illustrates a first step in a manufacturing process for manufacturing a light string.
Figure 11B:
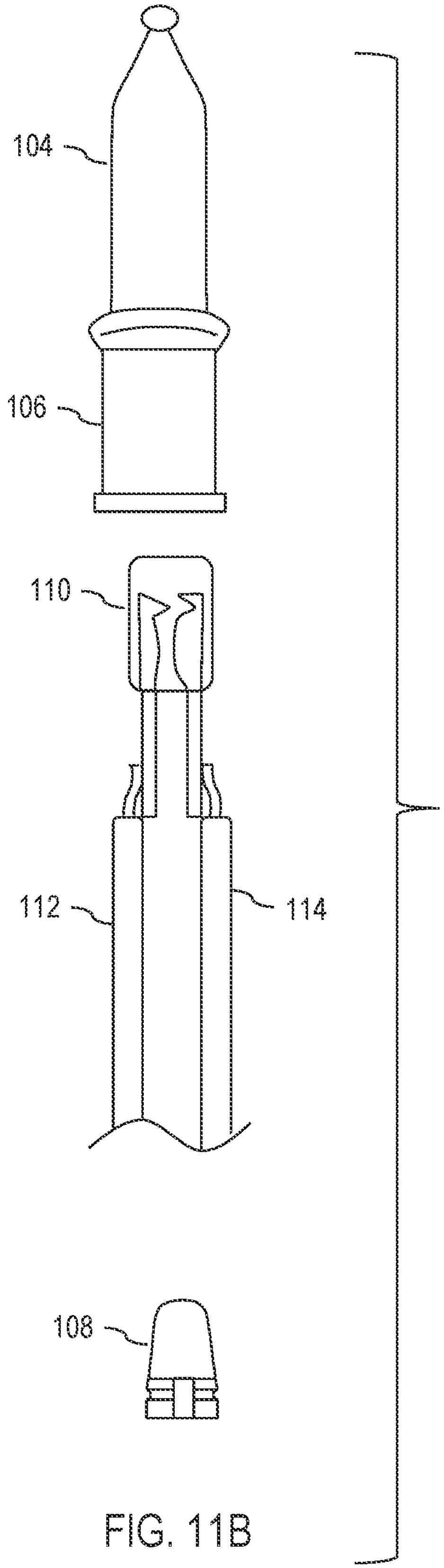
FIG. 11B illustrates a second step in the manufacturing process for manufacturing a light string.

Referring generally to FIG. 11A-FIG. 11D, a light string assembly process is illustrated by way of example. FIG. 11A shows a first lead wire 112 soldered to the anode leg of the LED 110, and the second lead wire 114 soldered to the cathode leg of the LED 110.

Methods herein comprise securing a light cap to a housing. Here, the light cap can be ultrasonically welded, glued, or otherwise coupled to the housing. See for example FIG. 11B, which shows the light cap 104 connected to the housing 106.

Methods herein further isolate the first conductive wire from the second conductive wire. For instance, a spacer plug can be inserted between the first conductive wire and the second conductive wire such that the first conductive wire is received in a first channel of the spacer plug (e.g., on a first side of the spacer plug), and the second conductive wire is received in a second channel of the spacer plug (e.g., opposite the first channel). The spacer plug is further arranged such that an arm/projection of the spacer plug seats between the conductive legs of the LED and or between the exposed sections of conductive wires.

As noted more fully herein, some embodiments comprise inserting the spacer plug between the first conductive wire and the second conductive wire by receiving the first conductive wire into a first groove channel of the spacer plug, and receiving the second conductive wire into a second groove channel of the spacer plug.

Figure 11C:
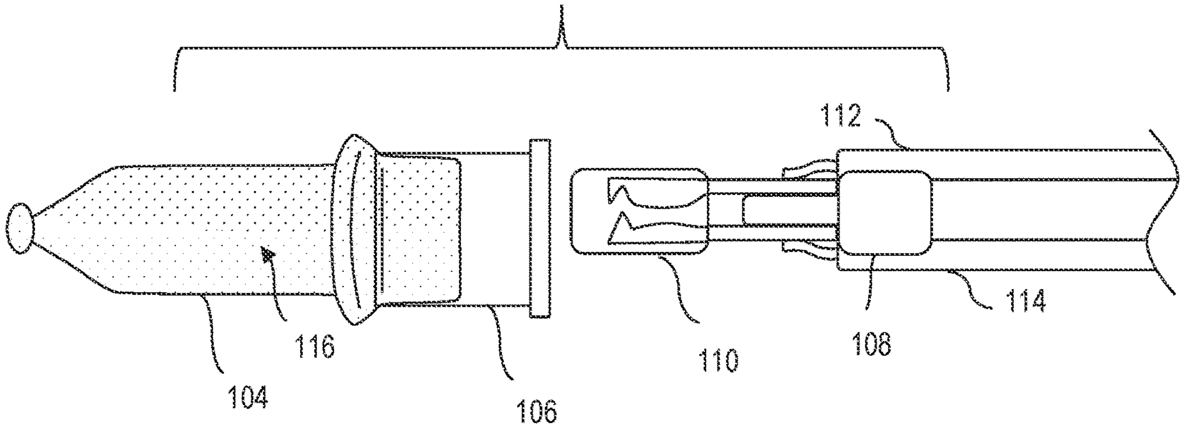
FIG. 11C illustrates a third step in the manufacturing process for manufacturing a light string.

Referring to FIG. 11C, the spacer 108 is positioned between the first conductive lead wire 112 and the second conductive lead wire 114 such that the arm of the spacer plug extends between the anode leg and cathode leg.

Methods herein further couple the housing/light cap to the light emitting source, conductive wires and spacer plug. This is accomplished by slipping the housing over the light emitting source such that the spacer plug is received into the housing. The spacer plug is secured to the housing, e.g., via glue, epoxy, adhesive, ultrasonic welding, bonding or other suitable process.

Methods herein further comprise inserting a filler into the housing. The filler can be used to provide waterproofing of electrical components, e.g., by sealing, encapsulating, coating, fixing or otherwise insulating the electrical connections. The filler 116 is illustrated as the shaded fill in the light cap 104.

Figure 11D:
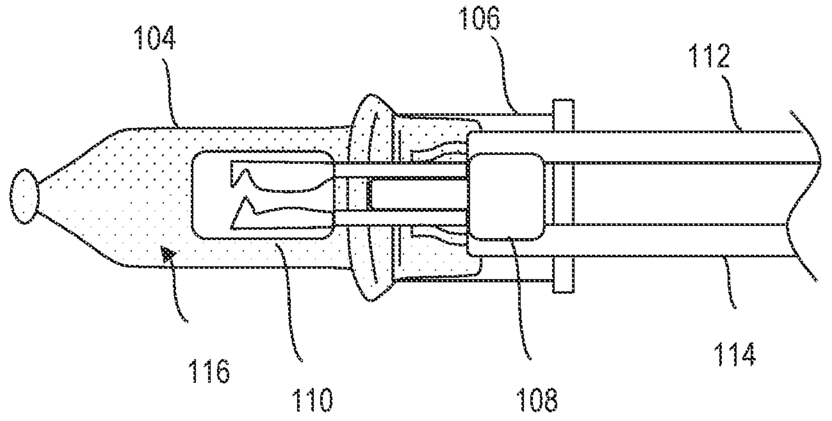
FIG. 11D is a cross-section/x-ray view provided to clarify the positioning of select components relative to a filler deposited in the light cap.

FIG. 11D shows a complete assembly in an x-ray/cross sectional view that is exaggerated to show the filler 116 in the light cap only (in this embodiment). Here, the filler 116 encapsulates the light emitting source 110 (e.g., LED) as well as exposed electrical connections, thus providing a water tight light string. Moreover, the filler (e.g., epoxy) bonds the light cap to the spacer plug 108, which secures the housing 106 to the light cap 104 and spacer plug 108.

For instance, epoxy can encapsulate, form a barrier, seal, or otherwise form a waterproof structure. Epoxy makes for a convenient way to secure the assembly together. Epoxy can form a seal, thus making the connector waterproof, and thus suitable for outdoor use. Epoxy can also be used to join and hold the components together, form a water-tight seal, and otherwise improve the reliability of the components, e.g., by fixing the components and preventing movement thereof.

By way of example, the light cap can be fixed to the housing, e.g., ultrasonically welded to the first body portion of the housing, epoxied to the first body portion of the housing, etc.; and the spacer plug can be fixed to the housing, e.g., ultrasonically welded to the second body portion of the housing, epoxied to the second body portion of the housing, etc. Here, the epoxy can function as the filler. However, even if ultrasonic welding is implemented, some embodiments, utilize filler to ensure a durable light string that is suitable for use outdoors.

In practical applications, there can be additional components. For instance, LEDS may be implemented as 2.5V or 3.5V and driven by AC 120 volt. In other applications, there may be one or more resistors, e.g., to create current/voltage constrained circuit(s). Yet further, the light string can include at least some of the light string assemblies in the light string wired in series with the wire set, wired in parallel with the wire set, or a combination thereof.

Figure 12A:
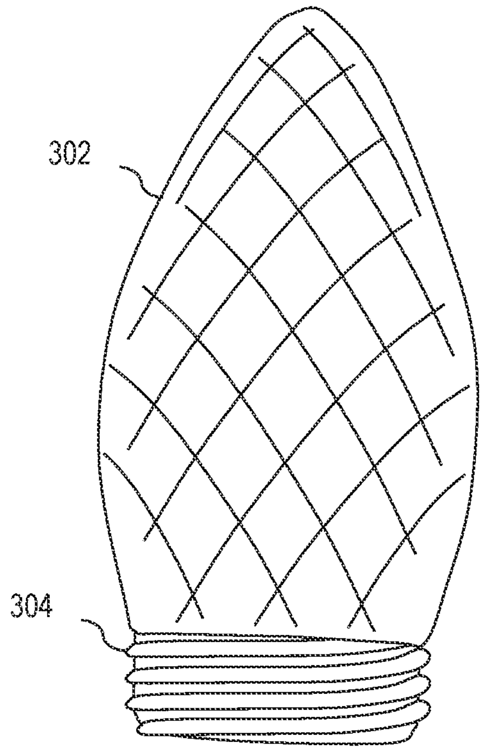
FIG. 12A is an example implementation of a faceted bulb.
Figure 12B:
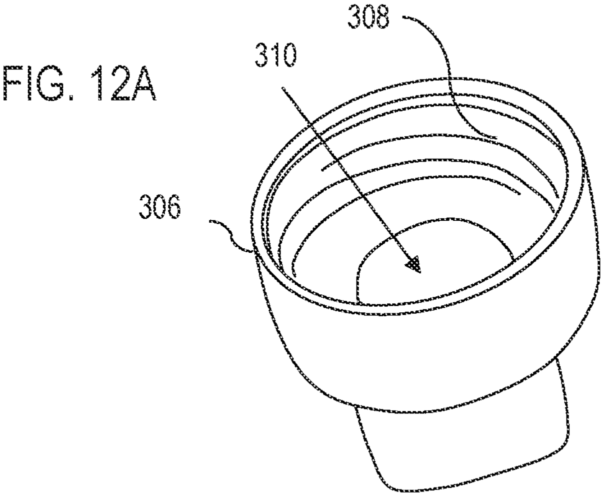
FIG. 12B is an example bulb holder for coupling the faceted bulb of FIG. 12A to a light string assembly, as described more fully herein.

Referring to FIG. 12A and FIG. 12B collectively, a light bulb clip includes a bulb portion 302 having a threaded portion 304, and a separate base 306 having a corresponding internal threaded portion 308 and a light aperture 310.

In practice, the base 306 can slip over/clip onto any of the light string 100 configurations described more fully herein, e.g., with regard to FIG. 1A, FIG. 1B, FIG. 1C, FIG. 1D, FIG. 1E, FIG. 1F, etc. In this regard, the bulb portion 302 can be attached to the base portion 306 either before or after assembly of the base 306 over a corresponding light element 100 (not shown). For instance, the threaded portion 304 of the bulb portion 302 can thread into the internal threaded portion 308 of the base 306 and the light from the light element 100 can shine through the bulb portion 302. The bulb portion allows a larger format light element than a conventional LED light.

Moreover, the bulb portion 302 can take non any styles and shapes, depending upon the application. For instance, the bulb portion 30 can be faceted, transparent, translucent, frosted, etc.

The base portion 306 can secure to the housing of a light element 100 mechanically, e.g., via friction, via a snap in ring, via fastening, welding, etc. For instance, an extending ring around the circumference of the housing 106 can snap into a corresponding groove on the inside of the light aperture 310, a groove on the housing 106 of the light element can receive a ring extending inwardly from the inside circumference of the base 306.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A light string, comprising:
- a housing with a passageway therethrough defining a light aperture and a wire aperture;
- a light cap, the light cap having:
  - a cap body that is non-opaque, the cap body having a hollow therein;
  - an upper tip at an upper end of the cap body forming an enclosed end of the light cap; and
  - a peripheral visibility ring extending outwardly from the cap body opposite the upper tip, the peripheral visibility ring being non-opaque;
  - wherein, the light cap is coupled to and extends from the housing such that the hollow of the cap body aligns axially with the light aperture and the peripheral visibility ring seats adjacent to an end of the housing proximate the light aperture; and
- a light assembly having:
  - a light emitting source, a first conductive lead wire electrically coupled to the light emitting source that extends out from the wire aperture of the housing, and a second conductive lead wire electrically coupled to the light emitting source that extends out from the wire aperture of the housing;
  - a filler deposited in the light cap that is transparent when solidified, the filler coupling the light cap and light assembly to the housing;
- wherein:
  - the light emitting source, when energized, emits light that is visible from outside the light cap;
  - the filler defines a light guide that directs light within the light cap to the peripheral visibility ring; and
  - the peripheral visibility ring reflects light in a direction different from the light emitted by the light emitting source such that the light emitted by the light emitting source is visible when an observer is looking at a side view of the cap body.

2. The light string of claim 1, wherein the peripheral visibility ring comprises a reflector such that light passes through the filler functioning as a light guide to the reflector such that a brightness of light viewed from a side of the cap body is similar to a brightness of light observed when viewing the upper tip.

3. The light string of claim 1, wherein the upper tip of the light cap comprises a tip reflector that reflects some light towards the peripheral visibility ring through the light guide of the filler.

4. The light string of claim 1 further comprising a spacer plug having an insulative projection that extends between the first conductive lead wire and the second conductive lead wire.

5. The light string of claim 4, wherein:
- the light assembly is coupled to the housing such that the light emitting source extends into and bonds with the filler, and at least a portion of the insulative projection extends into and bond with the filler such that the light string is impervious to water reaching the light emitting source in water up to 1 meter deep for up to 30 minutes.

6. The light string of claim 5, wherein:
- the filler comprises an epoxy that is transparent when solidified at least partially fills an internal volume of the light cap such that the light cap is epoxied to, and forms a water-tight seal with the light emitting source.

7. The light string of claim 5, wherein:
- the first contact of the light emitting source is implemented as an anode lead that is electrically coupled to a conductor of the first conductive lead wire;
- the second contact of the light emitting source is implemented as a cathode lead that is electrically coupled to a conductor of the second conductive lead wire; and
- the filler coats at least a portion of the anode lead and the cathode lead that extend into the light cap.

8. The light string of claim 7, wherein:
- the anode lead is electrically coupled to the conductor of the first conductive lead wire via at least one of splicing, contact crimping, welding or soldering;

the cathode lead is electrically coupled to the conductor of the second conductive lead wire via at least one of splicing, contact crimping, welding or soldering; and the filler bonds the first conductive lead wire and the second conductive lead wire that extend into the light cap to the spacer plug.

9. The light string of claim 5, wherein:

the filler fills the light cap and does not fill the housing.

10. The light string of claim 4, wherein:

the first conductive wire is sheathed in an insulator;

the second conductive wire is sheathed in an insulator;

the spacer plug includes a first channel and a second channel therealong;

the first channel receives the insulator of the first conductive wire; and the second channel receives the insulator of the second conductive wire.

11. The light string of claim 4, wherein:

the filler fills the light cap such that any exposed conductor within the light cap is covered by the epoxy sufficient to form a waterproof seal.

12. The light string of claim 1 further comprising:

a bulb holder having a passageway therethrough, the passageway defining a first end and a second end;

wherein:

the housing seats inside the passageway of the bulb holder by inserting into the first end of the bulb holder; and a faceted bulb couples to the bulb holder by inserting into the second end of the bulb holder.

13. A light string, comprising:

an electrical plug that plugs into a source of electrical power;

a wire set coupled to the electrical plug; and a set of light string assemblies coupled to the wire set, each light string assembly comprising:

a housing assembly having:

a housing with a passageway therethrough defining a light aperture and a wire aperture; and a light cap, the light cap having:

a cap body that is non-opaque, the cap body having a hollow therein;

an upper tip at an upper end of the cap body forming an enclosed tip of the light cap; and a peripheral visibility ring extending outwardly from the cap body opposite the upper tip, the peripheral visibility ring being non-opaque;

wherein, the light cap is coupled to and extends from the housing such that the hollow of the cap body aligns axially with the light aperture and the peripheral visibility ring seats adjacent to an end of the housing proximate the light aperture; and a light assembly having:

a light emitting source having a first contact, a second contact, and a light emitter coupled to the first contact and the second contact;

a first conductive lead wire electrically coupled to the first contact of the light emitting source;

a second conductive lead wire electrically coupled to the second contact of the light emitting source; and a spacer plug having an insulative projection that extends between the first conductive lead wire and the second conductive lead wire; and a filler deposited in the light cap that is transparent when solidified, the filler coupling the light cap and light assembly to the housing;

wherein:

the light assembly is coupled to the housing such that the light emitting source extends into and bonds with the filler, and at least a portion of the insulative projection extends into and bond with the filler;

the first conductive lead wire extends out the wire aperture of the housing, and the second conductive lead wire extends out the wire aperture of the housing;

the light emitting source, when energized, emits light visible from outside the light cap;

the filler defines a light guide that directs light within the light cap to the peripheral visibility ring; and the peripheral visibility ring reflects light in a direction different from the light emitted by the light emitting source such that the light emitted by the light emitting source is visible when an observer is looking at a side view of the cap body.

14. The light string of claim 13, wherein the peripheral visibility ring comprises a reflector such that light passes through the filler functioning as a light guide to the reflector such that a brightness of light viewed from a side of the cap body is similar to a brightness of light observed when viewing the upper tip.

15. The light string of claim 13, wherein the upper tip of the light cap comprises a tip reflector that reflects some light towards the peripheral visibility ring through the light guide of the filler.

16. The light string of claim 13, wherein, for each light string assembly in the light string:

the light emitting source is positioned within the housing assembly such that light emitted from the light emitting source shines out the light cap; and the filler comprises epoxy that fills an internal volume of the light cap such that the light cap is epoxied to, and forms a water-tight seal with the light emitting source.

17. The light string of claim 13, wherein for each light string assembly in the light string:

the light emitting source comprises a light emitting diode;

the first contact of the light emitting source is implemented as an anode lead that is electrically coupled to a conductor of the first conductive lead wire;

the second contact of the light emitting source is implemented as a cathode lead that is electrically coupled to a conductor of the second conductive lead wire; and the filler comprises epoxy that fills a hollow in the light cap and bonds the light cap to the light emitting diode, and the epoxy coats the anode lead and the cathode lead within the light cap.

18. The light string of claim 13, wherein:

the hollow of the housing includes a seat that creates an internal abutment surface;

the spacer plug includes an end portion forming a base for the insulative projection; and the epoxy bonds to at least a portion of the insulative projection such that the end portion of the spacer plug is adjacent the seat within the housing, thus securing the housing in place between the light cap and the end portion of the spacer plug.

19. The light string of claim 13 further comprising:

a bulb holder having a passageway therethrough, the passageway defining a first end and a second end;

wherein:

the housing seats inside the passageway of the bulb holder by inserting into the first end of the bulb holder; and a faceted bulb couples to the bulb holder by inserting into the second end of the bulb holder.

20. A method of making an light string comprising:

forming a housing assembly by:

coupling a light cap to a housing, the light cap having:

a cap body that is non-opaque, the cap body having a hollow therein;

an upper tip at an upper end of the cap body forming an enclosed end of the light cap; and a peripheral visibility ring extending outwardly from the cap body opposite the upper tip, the peripheral visibility ring being non-opaque;

wherein, the light cap is coupled to and extends from the housing such that the hollow of the cap body aligns axially with the light aperture of the housing and the peripheral visibility ring seats adjacent to an end of the housing proximate the light aperture; and forming a light assembly by:

coupling a first conductive lead wire to a first contact of a light emitting source so as to form a first electrical connection;

coupling a second conductive lead wire to a second contact of the light emitting source so as to form a second electrical connection, the light emitting source further comprising a light emitter electrically connected to the first contact and the second contact; and inserting a spacer plug between the first conductive lead wire and the second conductive lead wire so that an insulative projection of the spacer plug separates the first conductive lead wire from the second conductive lead wire;

inserting filler into the light cap, the filler being transparent when solidified, the filler coupling the light cap and light assembly to the housing; and inserting the light assembly into the housing assembly through a wire aperture of the housing, such that:

the light emitter of the light emitting source extends into the filler in the light cap;

at least a portion of the insulative projection of the spacer plug extends into the filler in the light cap;

the filler bonds the spacer plug and the light emitting source to the light cap;

the filler defines a light guide that directs light within the light cap to the peripheral visibility ring; and the peripheral visibility ring reflects light in a direction different from the light emitted by the light emitting source such that the light emitted by the light emitting source is visible when an observer is looking at a side view of the cap body.

21. The method of claim 20, wherein inserting filler into the light cap comprises:

filling a hollow of the light cap with epoxy;

such that:

the epoxy dries clear so as to allow light from the light emitting source to escape the light cap;

the epoxy bonds the light cap to the light emitting source;

the epoxy bonds the light cap to the spacer plug; and the spacer plug bonds to the light cap so as to secure the housing in place.

* * * * *